(12) United States Patent
Ishida

(10) Patent No.: US 11,695,248 B2
(45) Date of Patent: Jul. 4, 2023

(54) LASER DEVICE AND ELECTRONIC DEVICE MANUFACTURING METHOD

(71) Applicant: Gigaphoton Inc., Tochigi (JP)

(72) Inventor: Keisuke Ishida, Oyama (JP)

(73) Assignee: Gigaphoton Inc., Tochigi (JP)

( * ) Notice: Subject to any disclaimer, the term of this patent is extended or adjusted under 35 U.S.C. 154(b) by 35 days.

(21) Appl. No.: 17/665,087

(22) Filed: Feb. 4, 2022

(65) Prior Publication Data
US 2022/0158408 A1 May 19, 2022

Related U.S. Application Data

(63) Continuation of application No. PCT/JP2019/035662, filed on Sep. 11, 2019.

(51) Int. Cl.
*H01S 3/134* (2006.01)
*H01S 3/102* (2006.01)
*H01S 3/094* (2006.01)
*H01S 3/10* (2006.01)

(52) U.S. Cl.
CPC ...... *H01S 3/1024* (2013.01); *H01S 3/094076* (2013.01); *H01S 3/10015* (2013.01)

(58) Field of Classification Search
CPC ............. H01S 3/1024; H01S 3/094076; H01S 3/10015; H01S 3/10046; H01S 3/1306; H01S 3/10069; H01S 3/225; H01S 3/134; H01S 3/09702; H01S 3/036; H01S 3/104
See application file for complete search history.

(56) References Cited

U.S. PATENT DOCUMENTS

| | | |
|---|---|---|
| 6,418,155 B1 | 7/2002 | Wakabayashi et al. |
| 2001/0050939 A1 | 12/2001 | Ujazdowski et al. |
| 2002/0031160 A1* | 3/2002 | Desor ............... H01S 3/225 372/57 |

(Continued)

FOREIGN PATENT DOCUMENTS

| | | |
|---|---|---|
| JP | H10-144985 A | 5/1998 |
| JP | H11-191651 A | 7/1999 |
| WO | 2017/134745 A1 | 8/2017 |

OTHER PUBLICATIONS

International Search Report issued in PCT/JP2019/035662; dated Dec. 10, 2019.

(Continued)

*Primary Examiner* — Xinning (Tom) Niu
(74) *Attorney, Agent, or Firm* — Studebaker & Brackett PC

(57) ABSTRACT

A laser device may include a laser resonator; a chamber arranged on an optical path of the laser resonator; a pair of electrodes arranged in the chamber; a power source applying a voltage to the electrodes; a storage unit storing a voltage value; and a control unit configured to set an application voltage value of the voltage applied to the electrodes as setting the application voltage value for outputting a pulse whose pulse number is equal to or larger than 1 and smaller than i based on the voltage command value and the voltage value stored in the storage unit, and setting the application voltage for outputting a pulse whose pulse number is equal to or larger than i and smaller than j based on the voltage command value and an offset value corresponding to the voltage command value, where i>1 and j>i.

20 Claims, 26 Drawing Sheets

(56) References Cited

U.S. PATENT DOCUMENTS

| | | | | |
|---|---|---|---|---|
| 2004/0240507 A1* | 12/2004 | Govorkov | ............ | H01S 3/0977 372/55 |
| 2017/0222391 A1* | 8/2017 | Moriya | ................ | G01J 1/0425 |
| 2018/0006428 A1 | 1/2018 | Debregeas et al. | | |
| 2018/0309259 A1 | 10/2018 | Zhao et al. | | |
| 2018/0323568 A1* | 11/2018 | Furusato | ............... | H01S 3/2207 |
| 2019/0280451 A1* | 9/2019 | Asayama | ............. | H01S 3/0943 |

OTHER PUBLICATIONS

International Preliminary Report on Patentability and Written Opinion issued in PCT/JP2019/035662; dated Mar. 15, 2022.

\* cited by examiner

FIG. 6

DATA TABLE STORED IN STORAGE UNIT

| PAUSE PERIOD | | PULSE NUMBER n=1 | PULSE NUMBER n=2 |
|---|---|---|---|
| p = 1 | 20–50 ms | HVtbl[p,n] | HVtbl[p,n] |
| p = 2 | 50–80 ms | HVtbl[p,n] | HVtbl[p,n] |
| p = 3 | 80–100 ms | HVtbl[p,n] | HVtbl[p,n] |
| ⋮ | ⋮ | ⋮ | ⋮ |

(S292b, S293)

LASER DEVICE AND ELECTRONIC DEVICE MANUFACTURING METHOD

CROSS-REFERENCE TO RELATED APPLICATIONS

The present application claims the benefit of International Application No. PCT/JP2019/035662, filed on Sep. 11, 2019, the entire contents of which are hereby incorporated by reference.

BACKGROUND

1. Technical Field

The present disclosure relates to a laser device and an electronic device manufacturing method.

2. Related Art

Recently, in a semiconductor exposure apparatus, improvement in resolution has been desired for miniaturization and high integration of semiconductor integrated circuits. For this purpose, an exposure light source that outputs light having a shorter wavelength has been developed. For example, as a gas laser device for exposure, a KrF excimer laser device for outputting laser light having a wavelength of about 248 nm and an ArF excimer laser device for outputting laser light having a wavelength of about 193 nm are used.

The KrF excimer laser device and the ArF excimer laser device have a large spectral line width of about 350 to 400 μm in natural oscillation light. Therefore, when a projection lens is formed of a material that transmits ultraviolet rays such as KrF laser light and ArF laser light, there is a case in which chromatic aberration occurs. As a result, the resolution may decrease. Then, a spectral line width of laser light output from the gas laser device needs to be narrowed to the extent that the chromatic aberration can be ignored. For this purpose, there is a case in which a line narrowing module (LNM) including a line narrowing element (etalon, grating, and the like) is provided in a laser resonator of the gas laser device to narrow a spectral line width. In the following, a gas laser device with a narrowed spectral line width is referred to as a line narrowing gas laser device.

LIST OF DOCUMENTS

Patent Documents

Patent Document 1: U.S. Pat. No. 6,418,155
Patent Document 2: US Patent Application Publication No. 2018/309259

SUMMARY

A laser device according to an aspect of the present disclosure is configured to output pulse laser light by performing plural times of burst oscillation including first burst oscillation and second burst oscillation performed next to the first burst oscillation in accordance with a voltage command value and a trigger signal input from an external device. Here, the laser device includes a laser resonator; a chamber arranged on an optical path of the laser resonator; a pair of electrodes arranged in the chamber; a power source configured to apply a voltage to the electrodes; a storage unit configured to store a voltage value at which pulse energy of the pulse laser light becomes a predetermined value; and a control unit configured to set an application voltage value of the voltage applied to the electrodes as setting the application voltage value for outputting a pulse whose pulse number is equal to or larger than 1 and smaller than i based on the voltage command value and the voltage value stored in the storage unit, and setting the application voltage for outputting a pulse whose pulse number is equal to or larger than i and smaller than j based on the voltage command value and an offset value corresponding to the voltage command value, the pulse number indicating an order of the pulse among a plurality of pulses included in the pulse laser light output in one burst oscillation among the plural times of burst oscillation, where i is an integer larger than 1 and j is an integer larger than i.

An electronic device manufacturing method according to an aspect of the present invention includes generating pulse laser light using a laser device, emitting the pulse laser light to an exposure apparatus, and exposing a photosensitive substrate to the pulse laser light in the exposure apparatus to manufacture an electronic device. Here, the laser device is configured to output pulse laser light by performing plural times of burst oscillation including first burst oscillation and second burst oscillation performed next to the first burst oscillation in accordance with a voltage command value and a trigger signal input from an external device. Further, the laser device includes a laser resonator; a chamber arranged on an optical path of the laser resonator; a pair of electrodes arranged in the chamber; a power source configured to apply a voltage to the electrodes; a storage unit configured to store a voltage value at which a pulse energy of the pulse laser light becomes a predetermined value; a control unit configured to set an application voltage value of the voltage applied to the electrodes as setting the application voltage value for outputting a pulse whose pulse number is equal to and larger than 1 and smaller than i based on the voltage command value and the voltage value stored in the storage unit, and setting the application voltage for outputting a pulse whose pulse number is equal to or larger than i and smaller than j based on the voltage command value and an offset value corresponding to the voltage command value, the pulse number indicating an order of the pulse among a plurality of pulses included in the pulse laser light output in one burst oscillation among the plural times of burst oscillation, where i is an integer larger than 1 and j is an integer larger than i.

BRIEF DESCRIPTION OF THE DRAWINGS

Embodiments of the present disclosure will be described below merely as examples with reference to the accompanying drawings.

FIG. 6 conceptually shows contents of a data table stored in a storage unit.

DESCRIPTION OF EMBODIMENTS

Figure 1:
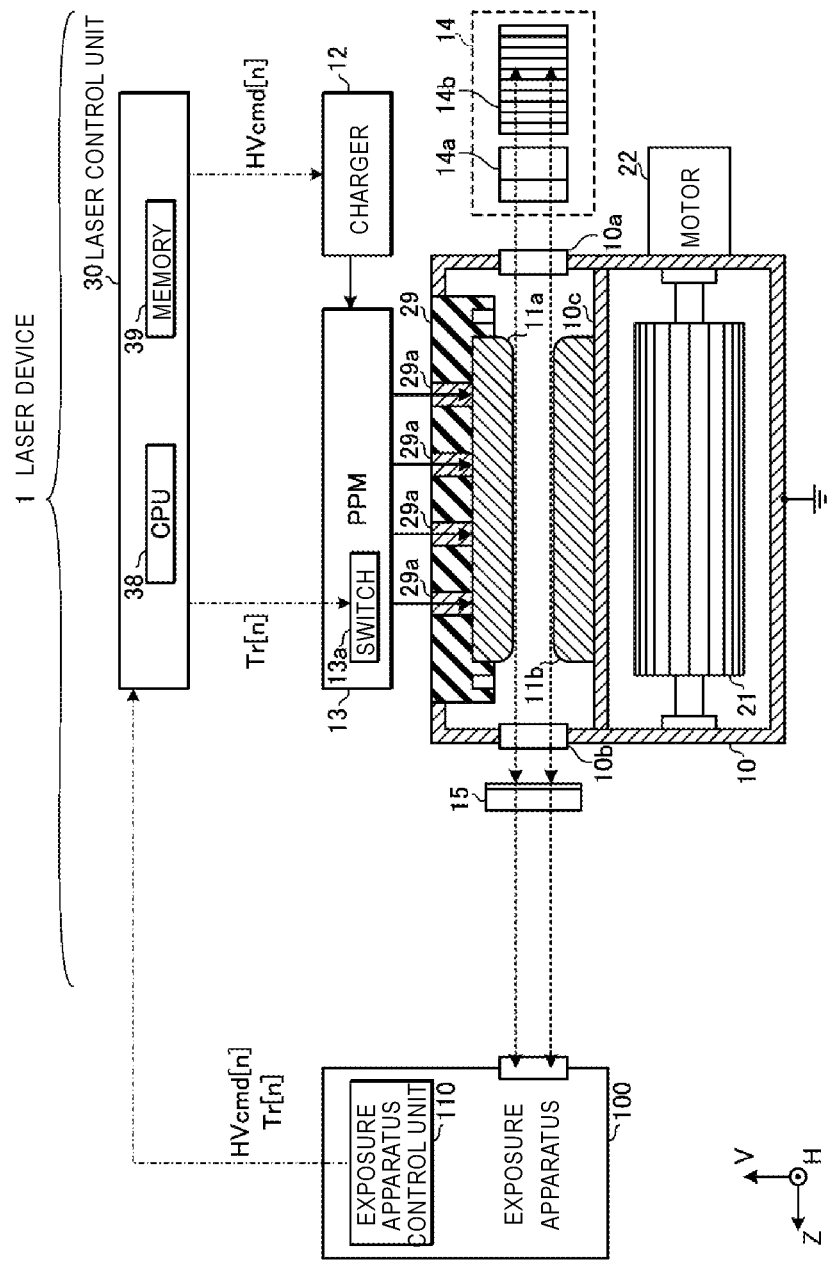
FIG. 1 schematically shows the configuration of a laser device according to a comparative example.

Content
1. Laser device according to comparative example
   1.1 Configuration
   1.2 Operation
   1.3 Problems of comparative example
2. Laser device in which application voltage is adjusted
   2.1 Configuration
   2.2 Operation
      2.2.1 Overview
      2.2.2 Measurement of pulse energy E[n]
      2.2.3 Main routine
      2.2.4 Updating parameters (S1)
      2.2.5 Setting application voltage value HV[n] (S2)
         2.2.5.1 Control using data table (S27)
         2.2.5.2 Control using offset value (S29)
   2.3 Effect
3. Laser device in which offset value is attenuated by constant amount
   3.1 Updating parameters (S1)
   3.2 Control using offset value (S29)
   3.3 Effect
4. Laser device in which attenuation amount of offset value is changed
   4.1 Control using offset value (S29)
   4.2 Effect
5. Laser device in which application voltage value is corrected based on repetition frequency
   5.1 Setting application voltage value HV[n] (S2)
   5.2 Control using data table (S28c)
   5.3 Effect
6. Laser device in which total attenuation amount and attenuation timing are corrected based on repetition frequency
   6.1 First example
   6.2 Second example
   6.3 Effect
7. Others Hereinafter, embodiments of the present disclosure will be described in detail with reference to the drawings. The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

1. Laser Device According to Comparative Example 1.1 Configuration

FIG. 1 schematically shows the configuration of a laser device 1 according to a comparative example. The laser device 1 is used together with an exposure apparatus 100 as an external device. The exposure apparatus 100 includes an exposure apparatus control unit 110.

The laser device 1 includes a chamber 10, a charger 12, a pulse power module (PPM) 13, a line narrowing module 14, an output coupling mirror 15, and a laser control unit 30. The line narrowing module 14 and the output coupling mirror 15 configure a laser resonator.

The chamber 10 is arranged in the optical path of the laser resonator. The chamber 10 is provided with windows 10*a*, 10*b*. An opening is formed in a part of the chamber 10, and the opening is closed by an insulating member 29. A plurality of conductive members 29a are embedded in the insulating member 29.

The chamber 10 accommodates a pair of electrodes 11a, 11b, a cross flow fan 21, and further, a laser gas as a laser medium. The laser medium is, for example, $F_2$, ArF, KrF, XeCl, or XeF. The electrode 11a is supported by the insulating member 29. The electrode 11a is electrically connected to the pulse power module 13 via the conductive members 29a. The electrode 11b is supported by a return plate 10c located inside the chamber 10. The electrode 11b is connected to the ground potential via the return plate 10c. Between the chamber 10 and the return plate 10c, gaps (not shown) through which the laser gas passes are provided on the front and back sides of the sheet of FIG. 1.

The rotation axis of the cross flow fan 21 is connected to a motor 22 arranged outside the chamber 10. The cross flow fan 21 is configured to circulate the laser gas inside the chamber 10.

The charger 12 holds electric energy to be supplied to the pulse power module 13. The pulse power module 13 includes a switch 13a. The power source in the present disclosure is configured by the charger 12 and the pulse power module 13. The line narrowing module 14 includes wavelength selection elements such as a prism 14a and a grating 14b. The output coupling mirror 15 is configured by a partial reflection mirror.

The laser control unit 30 is configured by a computer unit including a central processing unit (CPU) 38 and a memory 39. The memory 39 stores programs and data necessary for information processing. The CPU 38 is configured to read out various kinds of data and perform information processing in accordance with a program stored in the memory 39.

1.2 Operation

The exposure apparatus control unit 110 transmits a voltage command value HVcmd[n] and a trigger signal Tr[n] to the laser control unit 30. The laser control unit 30 transmits a setting signal of the voltage command value HVcmd[n] to the charger 12 and transmits the trigger signal Tr[n] to the switch 13a.

When receiving the trigger signal Tr[n] from the laser control unit 30, the switch 13a is turned on. When the switch 13a is turned on, the pulse power module 13 generates a pulse high voltage from the electric energy held in the charger 12. The pulse power module 13 applies the high voltage to the electrodes 11a, 11b.

When the high voltage is applied between the electrodes 11a, 11b, discharge occurs between the electrodes 11a, 11b. The laser gas in the chamber 10 is excited by the energy of the discharge and shifts to a high energy level. When the excited laser gas then shifts to a low energy level, light having a wavelength corresponding to the difference between the energy levels is emitted.

The light generated in the chamber 10 is output to the outside of the chamber 10 through the windows 10a, 10b. The beam width of the light output through the window 10a is expanded by the prism 14a, and then the light is incident on the grating 14b. The light incident on the grating 14b from the prism 14a is reflected by a plurality of grooves of the grating 14b and is diffracted in a direction corresponding to the wavelength of the light. The grating 14b is arranged in the Littrow arrangement, which causes the incident angle of the light incident on the grating 14b from the prism 14a to coincide with the diffraction angle of the diffracted light having a desired wavelength. Thus, light having a wavelength close to the desired wavelength returns into the chamber 10 via the prism 14a.

The output coupling mirror 15 transmits and outputs a part of the light output from the window 10b, and reflects the other parts thereof back into the chamber 10.

In this way, the light output from the chamber 10 reciprocates between the line narrowing module 14 and the output coupling mirror 15. The light is amplified every time when passing through a discharge space between the pair of discharge electrodes 11a, 11b. Further, the light is line narrowed each time being turned back in the line narrowing module 14. Thus, the light having undergone laser oscillation and line narrowing is output as pulse laser light from the output coupling mirror 15.

Pulse laser light output from the laser device 1 is incident on the exposure apparatus 100. The exposure apparatus 100 includes an energy monitor (not shown), and the exposure apparatus control unit 110 obtains the measurement result of the pulse energy E[n] of the pulse laser light from the energy monitor. The exposure apparatus control unit 110 sets the voltage command value HVcmd[n] by feedback control based on the measured pulse energy E[n] and the setting data of target pulse energy Etcmd.

Figure 2:
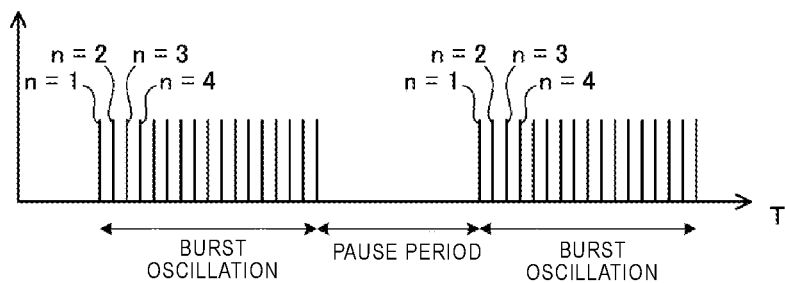
FIG. 2 is a pulse waveform diagram showing an example of a trigger signal Tr[n] output from an exposure apparatus control unit to the switch via a laser control unit.

FIG. 2 is a pulse waveform diagram showing an example of a trigger signal Tr[n] output from the exposure apparatus control unit 110 to the switch 13a via the laser control unit 30. In FIG. 2, the horizontal axis represents time T and the vertical axis represents light intensity. The exposure apparatus control unit 110 outputs the trigger signal Tr[n] at a repetition frequency F over a certain period of time. The laser device 1 performs laser oscillation in accordance with the trigger signal Tr[n] output at the repetition frequency F and outputs the pulse laser light at the repetition frequency F, which is referred to as "burst oscillation."

After outputting the trigger signal Tr[n] at the repetition frequency F, the exposure apparatus control unit 110 pauses the output of the trigger signal Tr[n]. Thereafter, the exposure apparatus control unit 110 outputs the trigger signal Tr[n] again at the repetition frequency F. The period in which the output of the trigger signal Tr[n] is paused between the first burst oscillation and the next second burst oscillation is referred to as a "pause period."

The period in which the burst oscillation is performed corresponds, for example, to the period in which exposure of one exposure area of a semiconductor wafer is performed in the exposure apparatus 100. The pause period corresponds, for example, to the period in which the imaging position of a reticle pattern is moved from one exposure area to another in the exposure apparatus 100 or the period in which the semiconductor wafer is replaced.

The pulse laser light output from the laser device 1 in one burst oscillation includes a plurality of pulses corresponding to the trigger pulses of the trigger signal Tr[n]. Let n be the pulse number indicating the order of the pulse among the plurality of pulses output from the laser device 1 in one burst oscillation. The pulse number n is defined so as to increase by 1 in the order of 1, 2, 3, . . . from the first pulse of burst oscillation for each burst oscillation. In the present disclosure, for signals individually output for the respective pulses and data individually measured for the respective pulses, [n] is added to the end of the sign. Further, when a specific pulse in the signal or data is referred to, [1], [2], or the like may be added to the end of the sign.

1.3 Problems of Comparative Example

Figure 3:
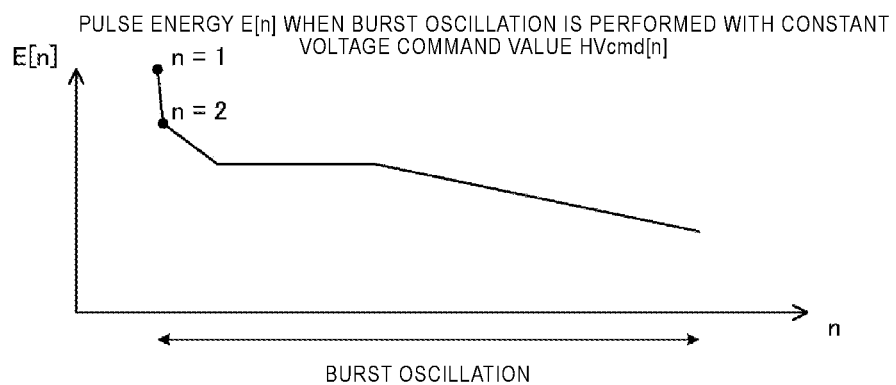
FIG. 3 is a graph showing transition of pulse energy E[n] when burst oscillation is performed with a voltage command value Hvcmd[n] being a constant value in the comparative example.

FIG. 3 is a graph showing transition of the pulse energy E[n] when the burst oscillation is performed with the voltage command value Hvcmd[n] being a constant value in the comparative example. The horizontal axis of FIG. 3 represents the pulse number n. When the pulse laser light is output at a high repetition frequency in the burst oscillation, there is a case in which the laser gain decreases. The decrease of the laser gain appears as a decrease of the pulse energy E[n] in FIG. 3. That is, even when the voltage command value HVcmd[n] is constant, there may be a case that the pulse energy E[n] is high at the start of the burst oscillation and the pulse energy E[n] decreases thereafter. Further, there may be a case that the pulse energy E[1] whose pulse number n is 1 is specifically high and the pulse energy E[n] rapidly decreases. In the middle of the burst oscillation, there may be a case that the pulse energy E[n] is once stabilized and decreases thereafter.

Further, there may be a case in which the laser gain is recovered in accordance with the length of the pause period from the end of the first burst oscillation to the start of the second burst oscillation. When the laser gain is recovered, the pulse energy E[n] is recovered. The fluctuation of the laser gain and the pulse energy E[n] in the burst oscillation may depend on the characteristics of the laser device 1.

Figure 4:
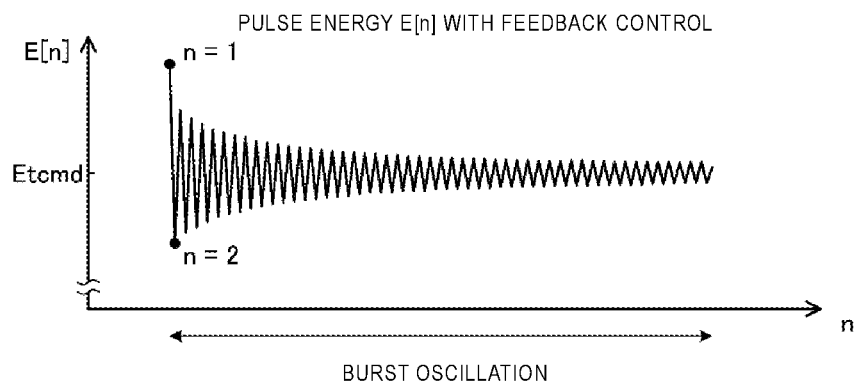
FIG. 4 is a graph showing transition of the pulse energy E[n] when the voltage command value Hvcmd[n] is feedback-controlled in the comparative example.

FIG. 4 is a graph showing transition of the pulse energy E[n] when the voltage command value Hvcmd[n] is feedback-controlled in the comparative example. In FIG. 4, the vertical axis is extended as compared with FIG. 3, and the fluctuation of the pulse energy E[n] is emphasized.

The exposure apparatus control unit 110 sets the voltage command value HVcmd[1] based on the setting data of the target pulse energy Etcmd for the first pulse (n=1) of the burst oscillation. When the first pulse (n=1) of the burst oscillation is output, the laser gain is recovered in accordance with the length of the pause period, and the pulse energy E[1] may be significantly higher than the target pulse energy Etcmd.

Then, the exposure apparatus control unit 110 sets the voltage command value HVcmd[2] for the next pulse (n=2) by feedback control based on the difference between the pulse energy E[1] and and the target pulse energy Etcmd. However, as shown in FIG. 3, there may be a case in which the laser gain greatly decreases when the next pulse (n=2) is to be output, as compared to when the first pulse (n=1) is output. Then, as shown in FIG. 4, the pulse energy E[2] of the next pulse (n=2) may be significantly lower than the target pulse energy Etcmd.

Thus, according to the feedback control of the exposure apparatus control unit 110, there is a possibility that the pulse energy E[n] becomes unstable particularly immediately after the start of burst oscillation and exposure performance is adversely affected.

2.2 Laser Device in which Application Voltage is Adjusted
2.1 Configuration

Figure 5:
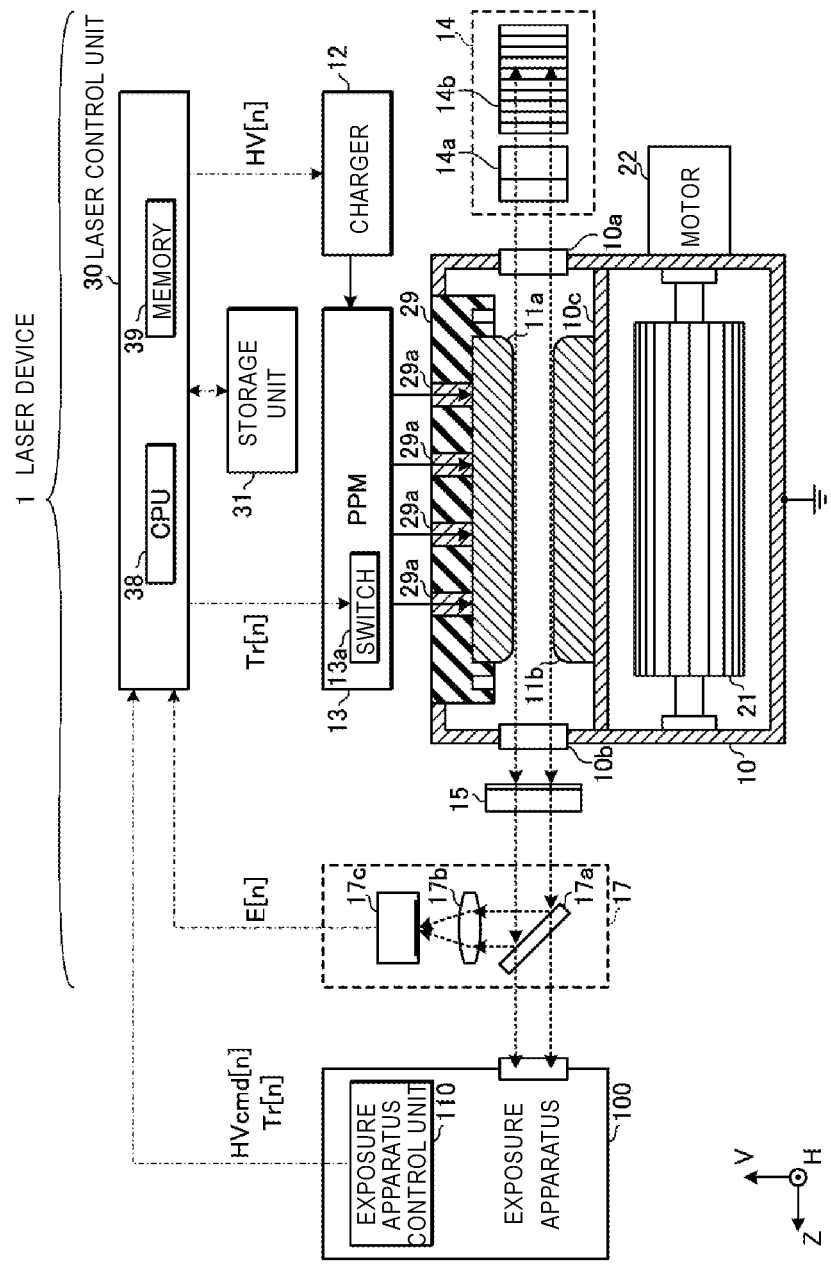
FIG. 5 schematically shows the configuration of the laser device according to a first embodiment.

FIG. 5 schematically shows the configuration of the laser device 1 according to a first embodiment. In the first embodiment, the laser device 1 further includes an energy monitor 17 and a storage unit 31.

The energy monitor 17 includes a beam splitter 17a, a light concentrating lens 17b, and a light sensor 17c. The beam splitter 17a is arranged in the optical path of the pulse laser light output from the output coupling mirror 15. The beam splitter 17a is configured to transmit a part of the pulse laser light output from the output coupling mirror 15 toward the exposure apparatus 100 at high transmittance and to reflect other parts thereof. The light concentrating lens 17b and the light sensor 17c are arranged in the optical path of the pulse laser light reflected by the beam splitter 17a.

The storage unit 31 is a storage device that stores a data table of voltage values HVtbl[p,n]. The data table can be read out from and write in the storage unit 31 by the laser control unit 30.

FIG. 6 conceptually shows the contents of the data table stored in the storage unit 31. In the following description, segments p defined in accordance with the length of the pause period are used. For example, the segments p of the pause period are defined as follows.
p=1: The pause period is 20 ms or more and less than 50 ms.
p=2: The pause period is 50 ms or more and less than 80 ms.
p=3: The pause period is 80 ms or more and less than 100 ms.

When the pause period is 100 ms or more, the segment p of the pause period may be 4 or more. When the period from one trigger pulse to the next trigger pulse is less than 20 ms, it is determined that burst oscillation is in progress rather than being in a pause period.

The storage unit 31 stores the data table in which the voltage value HVtbl [p,n] that causes the pulse energy E[n] to be a predetermined value Estd is associated with a combination [p,n] of the segment p of the pause period and the pulse number n. The predetermined value Estd is a pulse energy serving as a reference of processing of setting the application voltage value HV [n] in the present disclosure, and is, for example, 10 mJ. The data table includes the voltage value HVtbl[p,n] corresponding to the pulse number n immediately after the burst oscillation starts. For example, the voltage value HVtbl[p,1] when the pulse number n is 1 and the voltage value HVtbl[p,2] when the pulse number n is 2 are included. In other respects, the configuration of the first embodiment is similar to the configuration of the comparative example.

2.2 Operation
2.2.1 Overview

Figure 7:
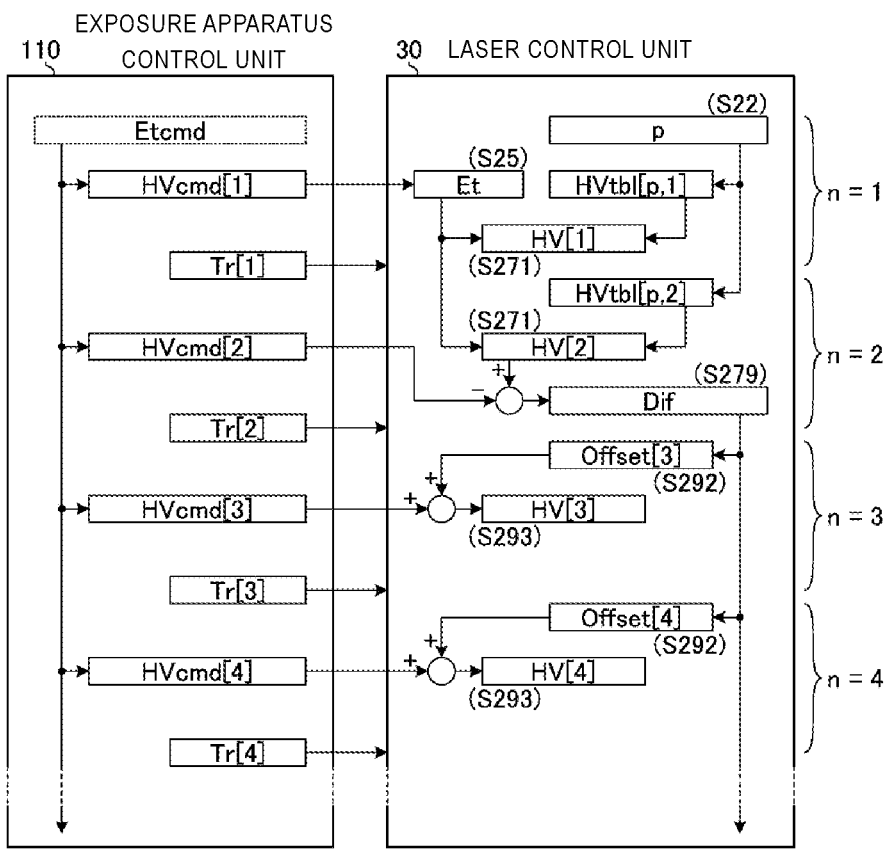
FIG. 7 is a time chart schematically showing operation of the laser control unit.

FIG. 7 is a time chart schematically showing the operation of the laser control unit 30. In FIG. 7, it is assumed that time advances downward from the upper end. The timing of receiving each of the voltage command value HVcmd[n] and the trigger signal Tr[n] from the exposure apparatus control unit 110 is also shown. The laser control unit 30 performs the following processing in accordance with the value of the pulse number n. In FIG. 7 and the following description, reference numerals beginning with S indicate corresponding step numbers in the flowchart described below.

(1)

$$n = 1$$

The laser control unit 30 measures the length of the pause period (S22) during the pause period. The laser control unit 30 determines the segment p in accordance with the length of the pause period. The laser control unit 30 receives the voltage command value HVcmd[1] from the exposure apparatus control unit 110. The laser control unit 30 calculates the target pulse energy Et based on the voltage command value HVcmd[1] (S25). The processes of S22 and S25 will be described later with reference to FIG. 11. Since the laser control unit 30 does not receive the target pulse energy Etcmd set by the exposure apparatus control unit 110, the laser control unit 30 performs the following processing using the target pulse energy Et calculated based on the voltage command value HVcmd[1].

The laser control unit 30 searches the data table based on the combination [p,1] of the segment p of the pause period and the pulse number n, and reads out the voltage value HVtbl[p,1] causing the pulse energy E[n] to have the predetermined value Estd. Based on the target pulse energy Et and the voltage value HVtbl[p,1], the laser control unit 30 sets the application voltage value HV[1] (S271).

The process of S271 will be described later with reference to FIG. 13. The laser control unit 30 transmits the setting signal of the application voltage value HV[1] to the charger 12.

That is, the laser control unit 30 does not directly set the voltage command value HVcmd[1] as the application voltage value, but sets the application voltage value HV[1] by using the voltage value HVtbl[p,1] read out from the data table. After setting the application voltage value HV[1], the laser control unit 30 receives the trigger signal Tr[1] from the exposure apparatus control unit 110 and transmits the trigger signal Tr[1] to the switch 13a.

(2)

$$n = 2$$

When the pulse number n is 2, the segment p of the pause period has already been determined, and the target pulse energy Et has already been calculated. The laser control unit 30 searches the data table based on the combination [p,2] of the segment p of the pause period and the pulse number n, and reads out the voltage value HVtbl[p,2] causing the pulse energy E[n] to have the predetermined value Estd. Based on the target pulse energy Et and the voltage value HVtbl[p,2], the laser control unit 30 sets the application voltage value HV[2] (S271). The laser control unit 30 transmits the setting signal of the application voltage value HV[2] to the charger 12.

After setting the application voltage value HV[2], the laser control unit 30 receives the trigger signal Tr[2] from the exposure apparatus control unit 110 and transmits the trigger signal Tr[2] to the switch 13a. After setting the application voltage value HV[2], the laser control unit 30 calculates a difference Dif between the voltage command value HVcmd[2] received from the exposure apparatus control unit 110 and the application voltage value HV[2] (S279). The process of S279 will be described later with reference to FIG. 13. Either the reception and transmission of the trigger signal Tr[2] or the calculation of the difference Dif may be performed first.

(3)

$$n \geq 3$$

When the pulse number n is 3, the laser control unit 30 calculates an offset value Offset[3] based on the difference Dif (S292). The offset value Offset[3] is, for example, the same value as the difference Dif. The laser control unit 30 sets the application voltage value HV[3] by adding the offset value Offset[3] to the voltage command value HVcmd[3] received from the exposure apparatus control unit 110 (S293). The laser control unit 30 transmits the setting signal of the application voltage value HV[3] to the charger 12. The processes of S292 and S293 will be described later with reference to FIG. 15.

The processing of the laser control unit 30 when the pulse number n is 4 is similar to the above-described processing when the pulse number n is 3. The laser control unit 30 calculates the offset value Offset[4] based on the difference Dif (S292), and sets the application voltage value HV[4] by adding the offset value Offset[4] to the voltage command value HVcmd[4] (S293). The processing of the laser control unit 30 when the pulse number n is 5 or larger is similar as well to the above-described processing when the pulse number n is 3. That is, when the pulse number n is 3 or larger, the laser control unit 30 sets the application voltage value HV[n] based on the voltage command value HVcmd[n] and the offset value Offset[n].

2.2.2 Measurement of Pulse Energy E[n]

Referring again to FIG. 5, the light concentrating lens 17b included in the energy monitor 17 concentrates the pulse laser light reflected by the beam splitter 17a on the light sensor 17c. The light sensor 17c transmits an electric signal corresponding to pulse energy E[n] of the pulse laser light concentrated by the light concentrating lens 17b to the laser control unit 30.

The pulse energy E[n] measured using the energy monitor 17 is used to update parameters GainHV, Const for calculating the target pulse energy Et. This will be described later as a process of S12 in FIG. 13. Further, the pulse energy E[n] measured using the energy monitor 17 is used to update the data table. This will be described later as a process of S277 in FIG. 13.

2.2.3 Main Routine

Figure 8:
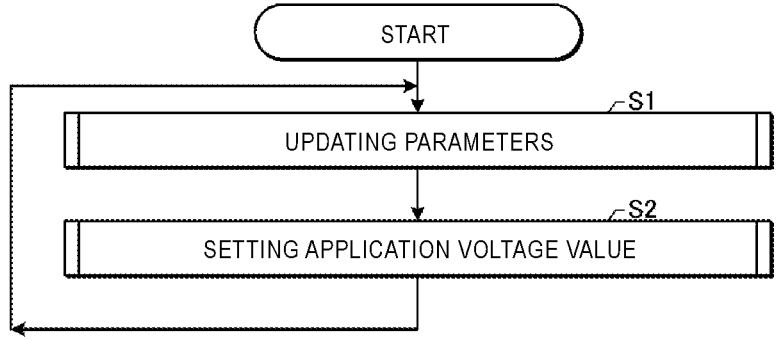
FIG. 8 is a flowchart showing processing of the laser control unit in the first embodiment.

FIG. 8 is a flowchart showing the processing of the laser control unit 30 in the first embodiment. The laser control unit 30 repeatedly performs the following two processes.

Updating parameters (S1)

Setting application voltage value HV[n] (S2)

Each process will be described below.

2.2.4 Updating Parameters (S1)

Figure 9:
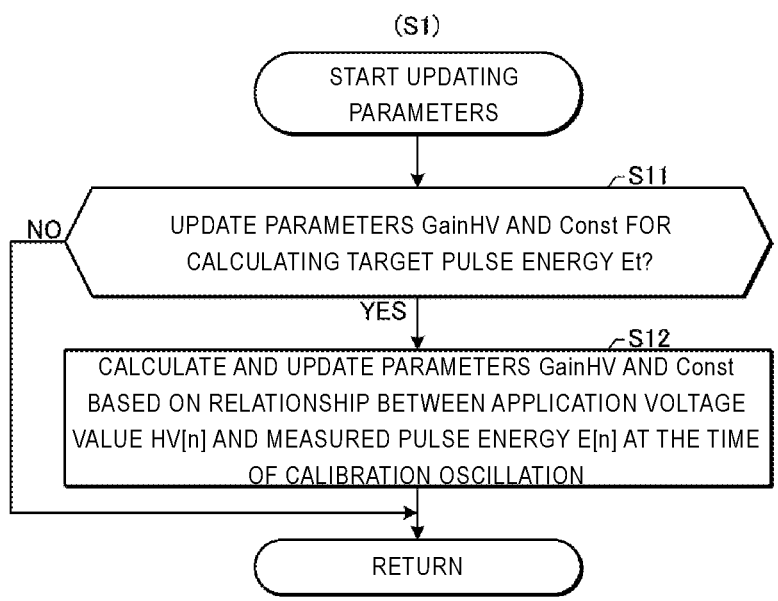
FIG. 9 is a flowchart showing processing of updating parameters in the first embodiment.

FIG. 9 is a flowchart showing processing of updating parameters in the first embodiment.

The processing shown in FIG. 9 is a subroutine of S1 in FIG. 8.

In S11, the laser control unit 30 determines whether or not to update the parameters GainHV, Const for calculating the target pulse energy Et. When the trigger signal Tr[n] received from the exposure apparatus control unit 110 indicates an oscillation pattern of calibration oscillation, the laser control unit 30 determines to update the parameters GainHV, Const. When the trigger signal Tr[n] received from the exposure apparatus control unit 110 indicates an oscillation pattern of semiconductor exposure, the laser control unit 30 determines not to update the parameters GainHV, Const. The calibration oscillation is laser oscillation performed by the exposure apparatus control unit 110 to obtain parameters for feedback control based on the target pulse energy Etcmd. The calibration oscillation is performed, for example, every time the semiconductor wafer is replaced.

When the parameters GainHV, Const are to be updated (S11: YES), the laser control unit 30 advances the process to S12. In S12, the laser control unit 30 calculates and updates the parameters GainHV, Const based on the relationship between the application voltage value HV[n] and the measured pulse energy E[n] at the time of the calibration oscillation. The application voltage value HV[n] at the time of the calibration oscillation is the same as the voltage command value HVcmd[n] received from the exposure apparatus control unit 110.

Figure 10:
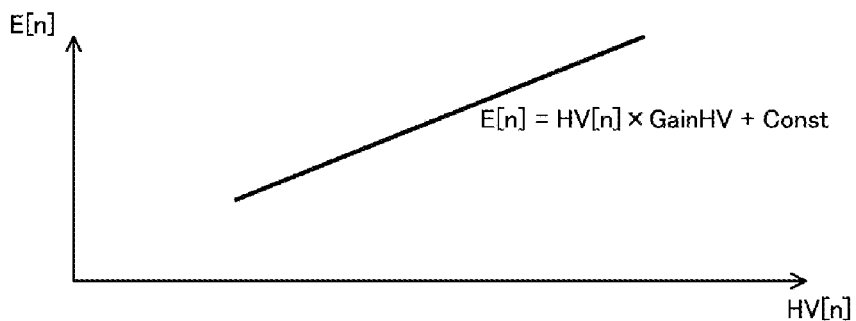
FIG. 10 is a graph showing relationship between an application voltage value HV[n] and the pulse energy E[n] obtained to calculate parameters GainHV, Const.

FIG. 10 is a graph showing the relationship between the application voltage value HV[n] and the pulse energy E[n] obtained to calculate the parameters GainHV, Const. In S12, the pulse energy E[n] is measured for each of a plurality of application voltage values HV[n] different from each other, and an approximate straight line is calculated from the relationship between the application voltage value HV[n]

and the pulse energy E[n]. The approximate straight line is expressed by the following equation.

$$E[n] = HV[n] \times A + B$$

At this time, the value of A is set as a new value of the parameter GainHV, and the value of B is set as a new value of the parameter Const.

Referring again to FIG. 9, when the parameters GainHV, Const in S11 (S11: NO) are not to be updated, or after S12, the laser control unit 30 terminates the process of the flowchart shown in FIG. 9 and returns to the process shown in FIG. 8.

2.2.5 Setting Application Voltage Value HV[n] (S2)

Figure 11:
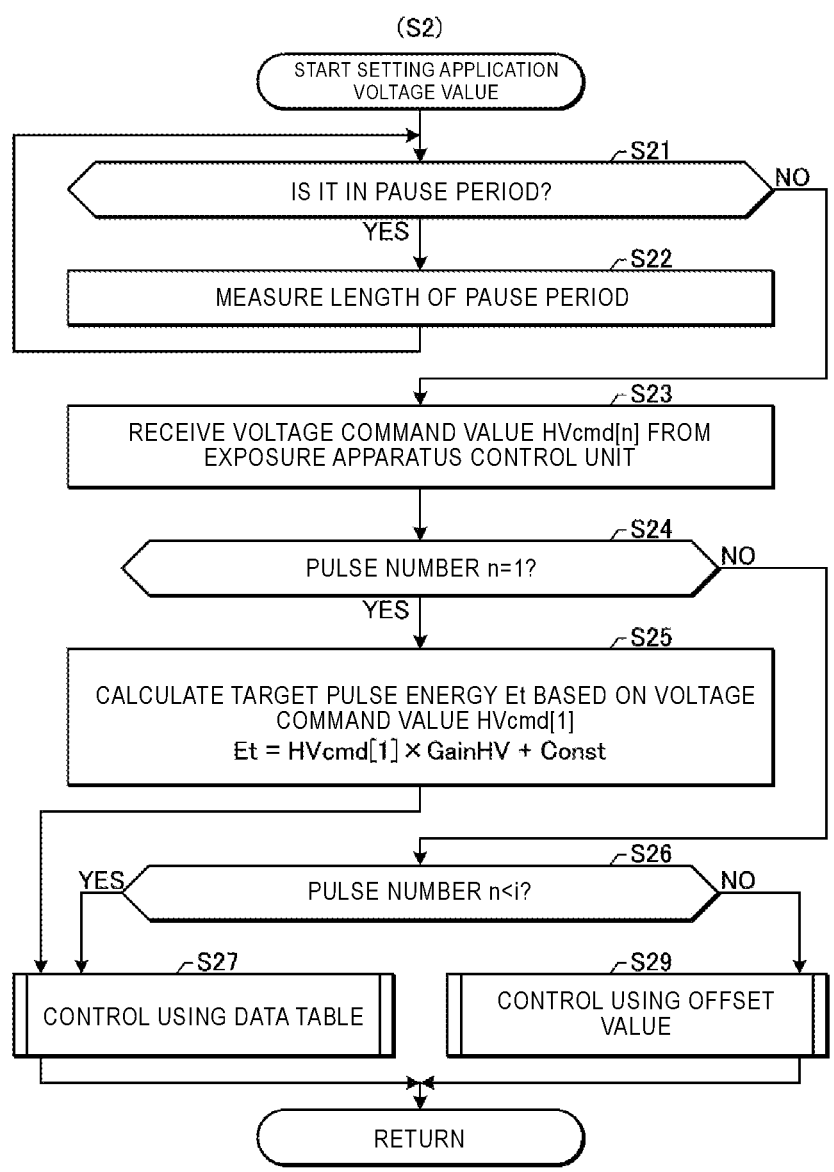
FIG. 11 is a flowchart showing processing of setting the application voltage value HV[n] in the first embodiment.

FIG. 11 is a flowchart showing processing of setting the application voltage value HV[n] in the first embodiment. The processing shown in FIG. 11 is a subroutine of S2 in FIG. 8.

In S21, the laser control unit 30 determines whether or not it is in the pause period based on the signal from the exposure apparatus control unit 110. When determining that it is in the pause period (S21: YES), the laser control unit 30 advances the process to S22. When determining that it is not in the pause period (S21: NO), the laser control unit 30 advances the process to S23.

In S22, the laser control unit 30 measures the length of the pause period (S22). After S22, the laser control unit 30 returns to S21. The laser control unit 30 repeats the processes of S21 and S22 until it is determined not to be in the pause period, and measures the length of the pause period.

In S23, the laser control unit 30 receives the voltage command value HVcmd[n] from the exposure apparatus control unit 110. Next, in S24, the laser control unit 30 determines whether or not the pulse number n is 1. When the pulse number n is 1 (S24: YES), the laser control unit 30 advances the process to S25. When the pulse number n is not 1 (S24: NO), the laser control unit 30 advances the process to S26.

Figure 12:
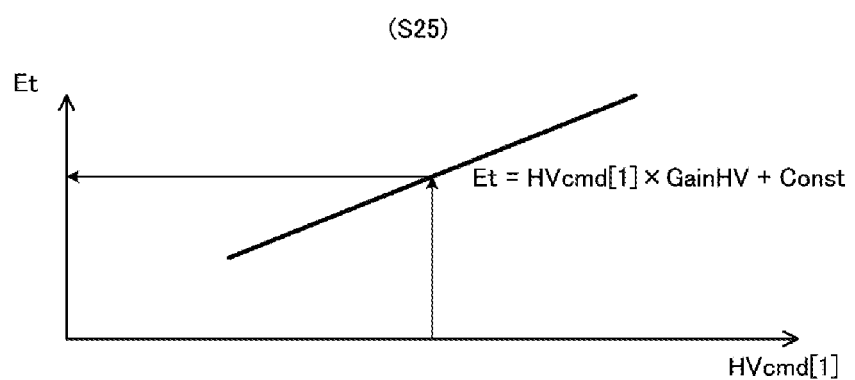
FIG. 12 is a graph explaining a principle of calculating target pulse energy Et based on the voltage command value HVcmd[1].

In S25, the laser control unit 30 calculates the target pulse energy Et based on the voltage command value HVcmd[1]. FIG. 12 is a graph explaining the principle of calculating the target pulse energy Et based on the voltage command value HVcmd[1]. As described with reference to FIG. 10, it is obtained from the measurement result at the time of the calibration oscillation that the application voltage value HV[n] and the pulse energy E[n] satisfy the following relationship.

$$E[n] = HV[n] \times GainHV + Const$$

The laser control unit 30 and the exposure apparatus control unit 110 obtain data independently from the same calibration oscillation. Therefore, it is assumed that there is no significant difference between the data obtained by the laser control unit 30 and the data obtained by the exposure apparatus control unit 110. Therefore, it is assumed that the target pulse energy Et calculated by the following equation using the voltage command value HVcmd[1] is not significantly different from the target pulse energy Etcmd set by the exposure apparatus control unit 110.

$$Et = HVcmd[1] \times GainHV + Const$$

Referring again to FIG. 11, in S26, the laser control unit 30 determines whether or not the pulse number n is smaller than i. Here, i is an integer larger than 1 and corresponds to the pulse number n at the time of starting the control using the offset value Offset[n]. For example, i is 3. When the pulse number n is smaller than i (S26: YES), the laser control unit 30 advances the process to S27. When the pulse number n is 1 and the process of S25 described above is finished, the laser control unit 30 also advances the process to S27. When the pulse number n is equal to or larger than i (S26: NO), the laser control unit 30 advances the process to S29.

In S27, the laser control unit 30 performs control using the data table. The control using the data table will be described later with reference to FIG. 13. In S29, the laser control unit 30 performs control using the offset value Offset[n]. The control using the offset value Offset[n] will be described later with reference to FIG. 15. After S27 or S29, the laser control unit 30 terminates the processing of the flowchart shown in FIG. 11 and returns to the processing shown in FIG. 8.

2.2.5.1 Control Using Data Table (S27)

Figure 13:
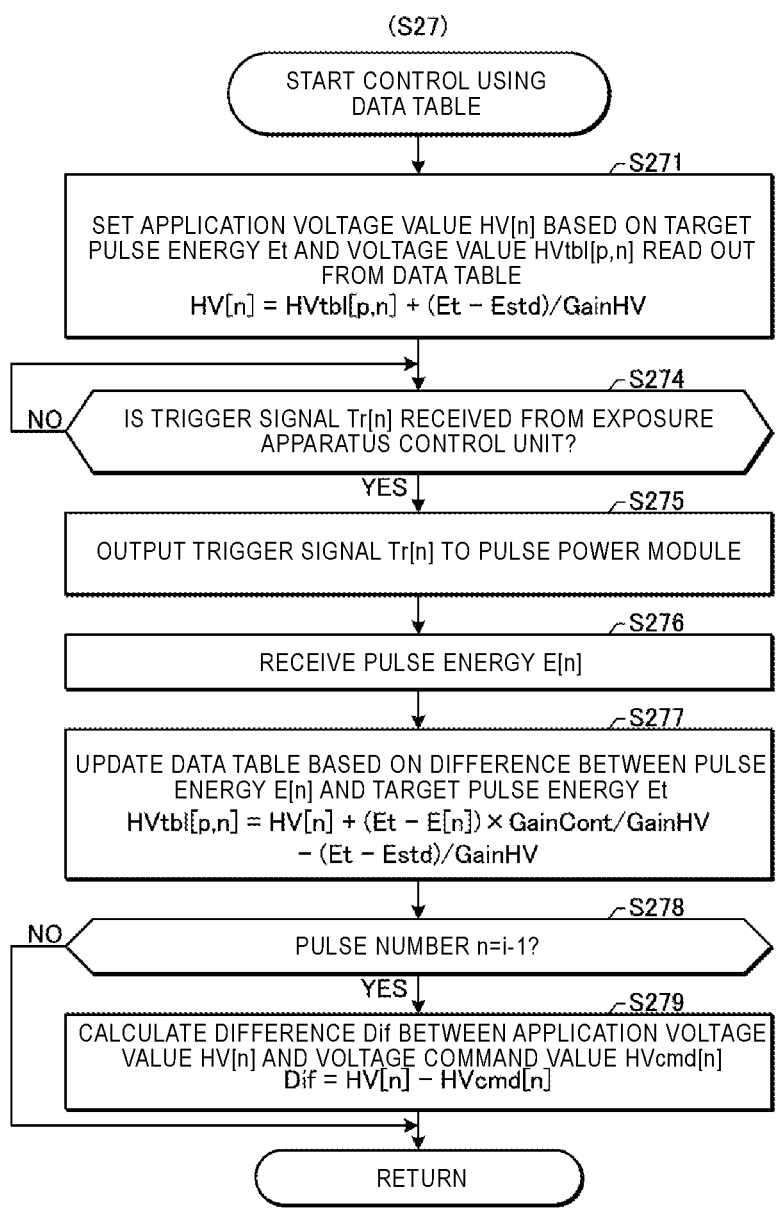
FIG. 13 is a flowchart showing control using the data table in the first embodiment.

FIG. 13 is a flowchart showing the control using the data table in the first embodiment. The processing shown in FIG. 13 is a subroutine of S27 in FIG. 11.

In S271, the laser control unit 30 reads out the voltage value HVtbl[p,n] from the data table based on the combination [p,n] of the segment p of the pause period and the pulse number n. Then, the laser control unit 30 sets the application voltage value HV[n] based on the target pulse energy Et and the voltage value HVtbl[p,n].

Figure 14:
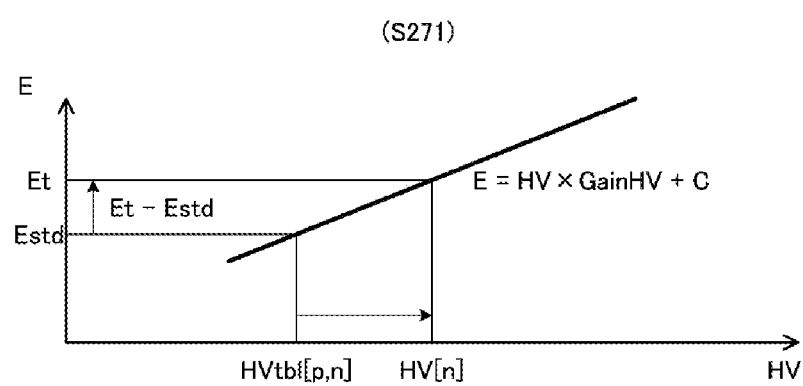
FIG. 14 is a graph explaining a principle of setting the application voltage value HV[n] based on the target pulse energy Et and a voltage value HVtbl[p,n].

FIG. 14 is a graph explaining the principle of setting the application voltage value HV[n] based on the target pulse energy Et and the voltage value HVtbl[p,n]. The voltage value HVtbl[p,n] read out based on the combination [p,n] of the segment p of the pause period and the pulse number n is a voltage value at which the pulse energy E[n] becomes the predetermined value Estd. Further, as described with reference to FIG. 10, the relationship between the application voltage value HV[n] and the pulse energy E[n] can be expressed by an approximate straight line having the parameter GainHV as a slope. Therefore, the voltage value HVtbl[p,n] corresponding to the predetermined value Estd can be converted into the application voltage value HV[n] corresponding to the target pulse energy Et by the following equation using the parameter GainHV.

$$HV[n] = HVtbl[p, n] + (Et - Estd)/GainHV$$

Referring again to FIG. 13, in S274, the laser control unit 30 determines whether or not the trigger signal Tr[n] is received from the exposure apparatus control unit 110. When the trigger signal Tr[n] is not received (S274: NO), the laser control unit 30 waits until the trigger signal Tr[n] is received. When the trigger signal Tr[n] is received (S274: YES), the laser control unit 30 advances the process to S275.

In S275, the laser control unit 30 outputs the trigger signal Tr[n] to the pulse power module 13. As a result, the pulse laser light is output from the laser device 1, and the pulse energy E[n] of the pulse laser light is measured by the energy monitor 17. In S276, the laser control unit 30 receives the measurement data of the pulse energy E[n] from the energy monitor 17.

In S277, the laser control unit 30 updates the voltage value HVtbl[p,n] of the data table based on the difference between the pulse energy E[n] and the target pulse energy Et. The voltage value HVtbl[p,n] is calculated by the following equation.

$$HVtbl[p, n] = HV[n] + (Et - E[n]) \times GainCont/GainHV - (Et - Estd)/GainHV$$

Here, GainCont is a proportional gain larger than 0 and smaller than 2. (Et-E[n])×GainCont/GainHV corresponds to an operation amount by proportional control. Further, by subtracting (Et-Estd)/GainHV, the voltage value HVtbl[p,n] is obtained so that the pulse energy E[n] becomes a predetermined value Estd.

The proportional gain GainCont may be a value being different in accordance with the pulse number n. For example, when the proportional gain when the pulse number n is 1 is GainCont[1] and the proportional gain when the pulse number n is 2 is GainCont[2], the voltage value HVtbl[p,n] of the data table may be calculated by the following equations.

$$HVtbl[p, 1] = HV[1] + (Et - E[1]) \times GainCont[1]/GainHV - (Et - Estd)/GainHV$$

$$HVtbl[p, 2] = HV[2] + (Et - E[2]) \times GainCont[2]/GainHV - (Et - Estd)/GainHV$$

The data table may be updated for combinations other than the specific combination [p,n] of the segment p of the pause period and the pulse number n. For example, in the case in which the pulse energy E[1] whose pulse number n is 1 is obtained, not only the voltage value HVtbl[p,1] but also the voltage value HVtbl[p,2] may be updated. When the data table is to be updated for combinations other than the specific combination [p,n], a proportional gain GainCont smaller than that for updating the data table for the specific combination [p,n] may be used.

The data table may be updated after the pulse whose pulse number n is 1 is output and before the pulse whose pulse number n is 2 is output. Thus, the application voltage value HV[n] whose pulse number n is 2 can be set in accordance with the measurement result of the pulse energy E[n] when the pulse number n is 1.

The data table may be updated not only during the burst oscillation but also after a part of the gas inside the chamber 10 is exchanged or after the gas concentration is adjusted.

In S278, the laser control unit 30 determines whether or not the pulse number n is i−1. The pulse whose pulse number n is i−1 is the last pulse of the pulses for which control (S27) using the data table is performed. When the pulse number n is i−1 (S278: YES), the laser control unit 30 advances the process to S279.

In S279, the laser control unit 30 calculates the difference Dif between the application voltage value HV[n] and the voltage command value HVcmd[n] by the following equation.

$$Dif = HV[n] - HVcmd[n]$$

Figure 15:
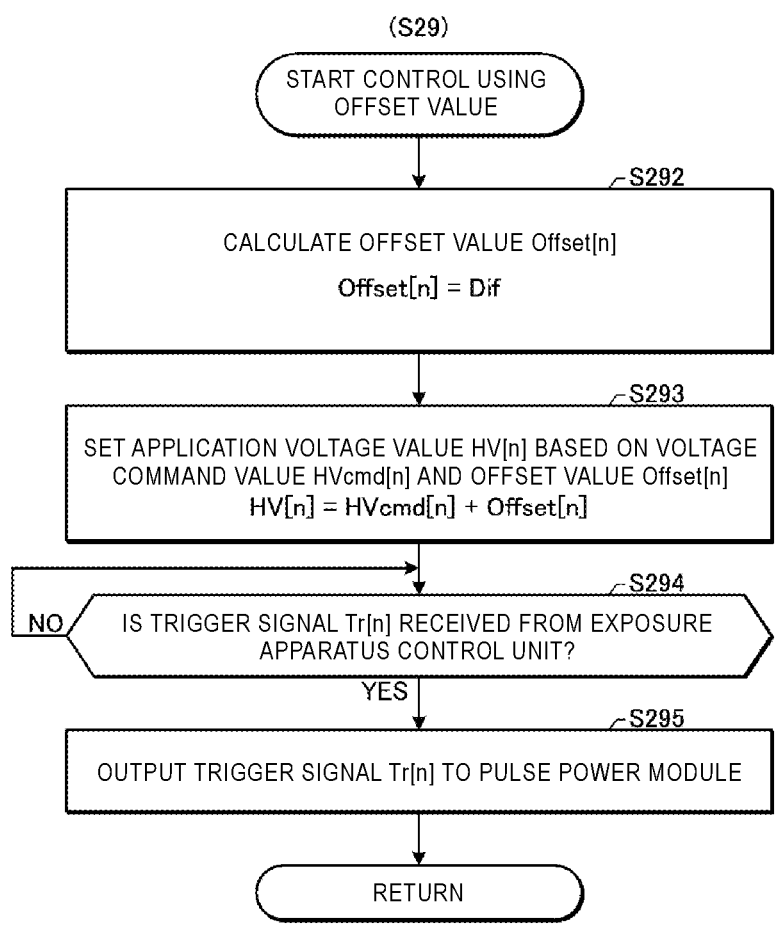
FIG. 15 is a flowchart showing control using an offset value Offset[n] in the first embodiment.

The difference Dif is used in S292 in FIG. 15.
When the pulse number n is not i−1 in S278 (S278: NO), or after S279, the laser control unit 30 terminates the processing of the flowchart shown in FIG. 13 and returns to the processing shown in FIG. 11.

2.2.5.2 Control Using Offset Value (S29)

FIG. 15 is a flowchart showing the control using the offset value Offset[n] in the first embodiment. The processing shown in FIG. 15 is a subroutine of S29 in FIG. 11.

In S292, the laser control unit 30 calculates the offset value Offset[n] by the following equation.

$$Offset[n] = Dif$$

That is, the offset value Offset[n] in the processing of FIG. 15 is set to a constant value regardless of the value of the pulse number n.

In S293, the laser control unit 30 sets the application voltage value HV[n] by the following equation based on the voltage command value HVcmd[n] and the offset value Offset[n].

$$HV[n] = HVcmd[n] + Offset[n]$$

Here, the pulse number n is in a range of i or larger and smaller than j. Here, j is an integer larger than i, and is, for example, a number obtained by adding 1 to the number of pulses of one burst oscillation.

Figure 16:
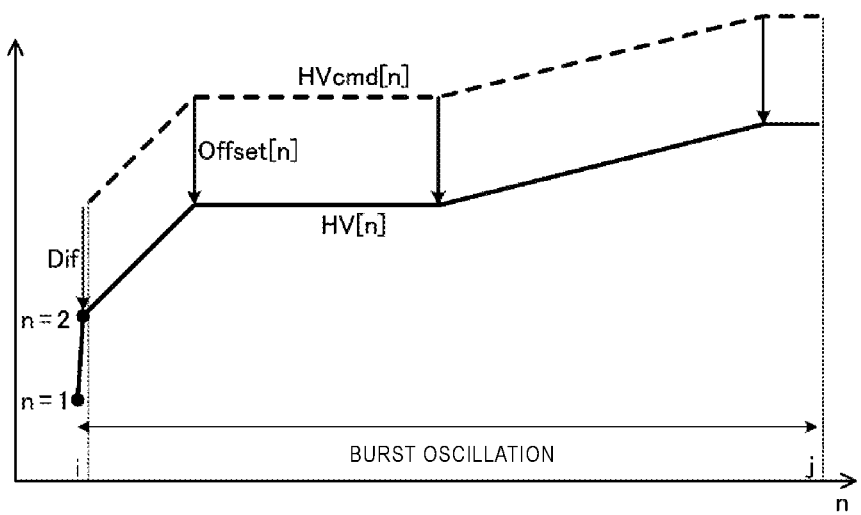
FIG. 16 is a graph showing transition of the application voltage value HV[n] in the first embodiment.

FIG. 16 is a graph showing the transition of the application voltage value HV[n] in the first embodiment. The horizontal axis of FIG. 16 represents the pulse number n. When the pulse number n is 1 or 2, the application voltage value HV[n] is set by the control (S27) using the data table. FIG. 16 also shows the voltage command value HVcmd[n] when the pulse number n is larger than 2. According to S279 of FIG. 13, the difference Dif between the application voltage value HV[2] and the voltage command value HVcmd[2] when the pulse number n is 2 is calculated. In the example shown in FIG. 16, the difference Dif is a negative value.

In S292, the offset value Offset[n] is set to the same value as the difference Dif.

Further, in S293, the application voltage value Hv[n] is set by adding the offset value Offset[n] to the voltage command value HVcmd[n]. The voltage command value HVcmd[n] is feedback-controlled by the exposure apparatus control unit 110 so that the pulse energy E[n] is maintained at a value near the target pulse energy Etcmd. As described with reference to FIG. 3, when the laser gain decreases during the burst oscillation due to the characteristics of the laser device 1, the voltage command value HVcmd[n] increases accordingly.

When the pulse number n is equal to or larger than i and smaller than j, the change in the laser gain is more gradual than that in a period immediately after the start of the burst oscillation in which the pulse number n is equal to or larger than 1 and smaller than i. Therefore, when the pulse number n is equal to or larger than i and smaller than j, the pulse energy E[n] can be maintained at a value near the target pulse energy Etcmd by feedback control by the exposure apparatus control unit 110.

Further by setting the application voltage value HV[n] using the offset value Offset[n] that is the same as the difference Dif, a rapid change in the application voltage value HV[n] is suppressed, and thus it is possible to obtain stable pulse energy E[n].

Referring again to FIG. 15, in S294, the laser control unit 30 determines whether or not the trigger signal Tr[n] is received from the exposure apparatus control unit 110. When the trigger signal Tr[n] is not received (S294: NO), the laser control unit 30 waits until the trigger signal Tr[n] is received. When the trigger signal Tr[n] is received (S294: YES), the laser control unit 30 advances the process to S295.

In S295, the laser control unit 30 outputs the trigger signal Tr[n] to the pulse power module 13. As a result, the pulse laser light is output from the laser device 1. After S295, the laser control unit 30 terminates the processing of the flowchart shown in FIG. 15 and returns to the processing shown in FIG. 11.

2.3 Effect (1) According to the first embodiment, in the period immediately after the start of the burst oscillation in which the pulse number n is smaller than i, the application voltage value HV[n] is set based on the voltage value HVtbl[p,n] read out from the data table (S271 in FIG. 13). Accordingly, even when the voltage command value HVcmd[n] fluctuates in the period immediately after the start of the burst oscillation, the application voltage value H[n] can be set appropriately in accordance with the characteristics of the laser device 1.

Further, according to the first embodiment, the application voltage value HV[n] is set based on the offset value Offset[n] in the period in which the pulse number n is equal to or larger than i (S292 and S293 in FIG. 15). Accordingly, the application voltage value HV[n] when shifting to the control (S29) using the offset value Offset[n] from the control (S27) using the data table is suppressed from abruptly fluctuating, and stable pulse energy E[n] can be obtained.

(2) According to the first embodiment, the voltage value HVtbl[p,n] is stored in association with the combination of the segment p of the pause period and the pulse number n in the data table. Then, the corresponding voltage value HVtbl[p,n] is read out from the data table (S271 in FIG. 13). Accordingly, it is possible to set a finely appropriate application voltage value HV[n] in accordance with the segment p of the pause period and the pulse number n.

(3) According to the first embodiment, the target pulse energy Et is calculated based on the voltage command value HVcmd[1] received from the exposure apparatus control unit 110 (S25 in FIG. 11). Then, the application voltage value HV[n] is calculated based on the target pulse energy Et and the voltage value HVtbl[p,n] read out from the data table (S271 in FIG. 13). Accordingly, even when the target pulse energy Etcmd set by the exposure apparatus control unit 110 is not received, the pulse energy E[n] close to the target pulse energy Etcmd can be obtained.

(4) According to the first embodiment, the parameters GainHV, Const for calculating the target pulse energy Et based on the voltage command value HVcmd[1] are calculated based on the measured data at the time of calibration oscillation (S12 in FIG. 9). Accordingly, the laser control unit 30 can obtain parameters under the same conditions as those under which the exposure apparatus control unit 110 obtains parameters.

(5) According to the first embodiment, the data table is updated based on the difference between the measurement value of the pulse energy E[n] and the target pulse energy Et (S277 in FIG. 13). Accordingly, even when the characteristics of the laser device 1 changes, the application voltage value HV[n] can be set appropriately.

(6) According to the first embodiment, the data table is updated after the pulse whose pulse number n is 1 is output and before the pulse whose pulse number n is 2 is output (S277 in FIG. 13). Accordingly, it is possible to quickly follow a change in the characteristics of the laser device 1 and set the application voltage value HV[n] appropriately.

(7) According to the first embodiment, the offset value Offset[n] is calculated based on the difference Dif between the voltage command value HVcmd[n] and the application voltage value HV[n] for outputting a pulse whose pulse number n is i−1 (S279 in FIG. 13 and S292 in FIG. 15). Accordingly, it is possible to suppress a large fluctuation of the pulse energy E[n] at the time of shifting to the control (S29) using the offset value Offset[n] from the control (S27) using the data table.

(8) According to the first embodiment, since the offset value Offset[n] is set to a constant value without being changed in the middle of the burst oscillation, it is possible to suppress complication of calculation processing.

3. Laser Device in which Offset Value is Attenuated by Constant Amount

A second embodiment will be described with reference to FIGS. 17 to 21. The second embodiment is different from the first embodiment in that the offset value Offset[n] is not a constant value and attenuates during burst oscillation. In the second embodiment, the period in which the pulse number n is equal to or larger than i and smaller than j is defined as an attenuation period, and the offset value Offset[n] attenuates over the attenuation period. Here, j is an integer larger than i. The configuration of the laser device 1 according to the second embodiment is similar to the configuration of the first embodiment described with reference to FIG. 5.

3.1 Updating Parameters (S1)

Figure 17:
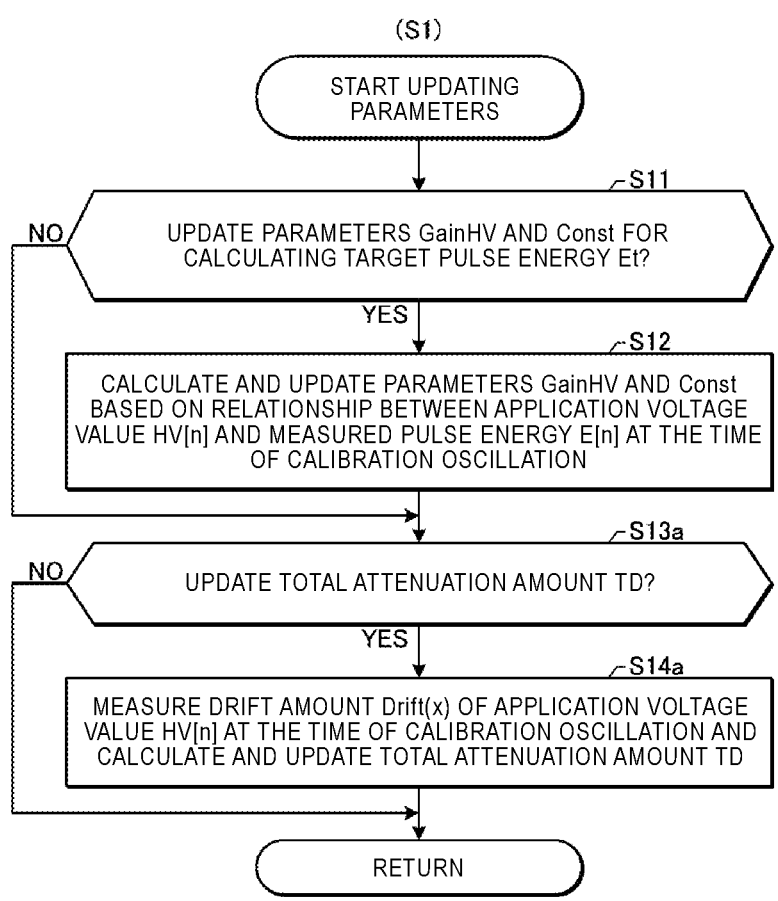
FIG. 17 is a flowchart showing processing of updating parameters in a second embodiment.

FIG. 17 is a flowchart showing processing of updating parameters in the second embodiment. The main routine in the second embodiment is similar to the main routine in the first embodiment described with reference to FIG. 8. The processing shown in FIG. 17 is a subroutine of S1 in FIG. 8.

The processes of S11 to S12 are similar to the corresponding processes in FIG. 9. In FIG. 17, when the parameters GainHV, Const are not to be updated (S11: NO), or after S12, the laser control unit 30 advances the process to S13a.

In S13a, the laser control unit 30 determines whether or not to update a total attenuation amount TD. When the trigger signal Tr[n] received from the exposure apparatus control unit 110 indicates an oscillation pattern of the calibration oscillation, the laser control unit 30 determines to update the total attenuation amount TD. When the trigger signal Tr[n] received from the exposure apparatus control unit 110 indicates an oscillation pattern of semiconductor exposure, the laser control unit 30 determines not to update the the total attenuation amount TD. Further, the laser control unit 30 may determine to update the total attenuation amount TD after replacing a part of the gas inside the chamber 10 or after adjusting the gas concentration.

When the total attenuation amount TD is to be updated (S13a: YES), the laser control unit 30 advances the process to S14a. In S14a, the laser control unit 30 measures a drift amount Drift(x) of the application voltage value HV[n] at the time of the calibration oscillation. The laser control unit 30 calculates the total attenuation amount TD based on the measured drift amount Drift(x) and updates the total attenuation amount TD.

Figure 18:
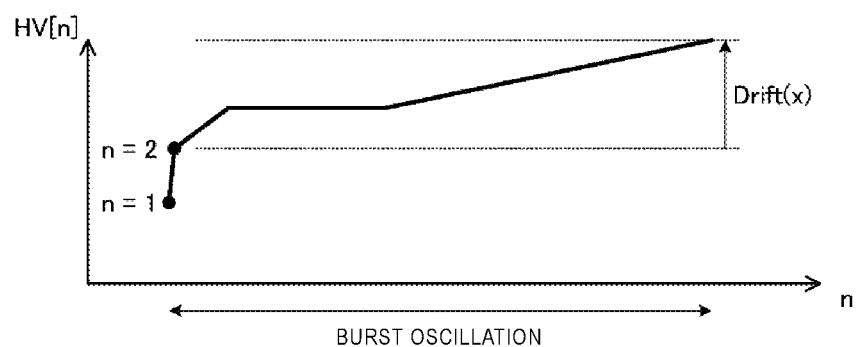
FIG. 18 is a graph showing transition of the application voltage value HV[n] obtained to calculate a total attenuation amount TD.

FIG. 18 is a graph showing the transition of the application voltage value HV[n] obtained to calculate the total attenuation amount TD. As described with reference to FIG. 3, there may be a case in which the laser gain decreases during the burst oscillation due to the characteristics of the laser device 1. In the calibration oscillation, when the application voltage value HV[n] is set so as to maintain the pulse energy E[n] at a constant value, the application voltage value HV[n] increases. Therefore, the laser control unit 30 measures the increase width of the application voltage value HV[n] from the time when the pulse number n is i to the end of the burst oscillation as the drift amount Drift(x). The laser control unit 30 further calculates the total attenuation amount TD based on the drift amount Drift(x).

The total attenuation amount TD is calculated by the following equation.

$$TD = Sum(Drift(x-9:x))/10$$

Here, Sum(Drift(x−9:x)) is the sum of the measurement results of the drift amount Drift(x) of the last 10 times. The total attenuation amount TD corresponds to the moving average value of the drift amounts Drift(x) of the last 10 times.

When the total attenuation amount TD is not to be updated in S13a (S13a: NO), or after S14a, the laser control unit 30 terminates the process of the flowchart shown in FIG. 17 and returns to the process shown in FIG. 8.

3.2 Control Using Offset Value (S29)

Figure 19:
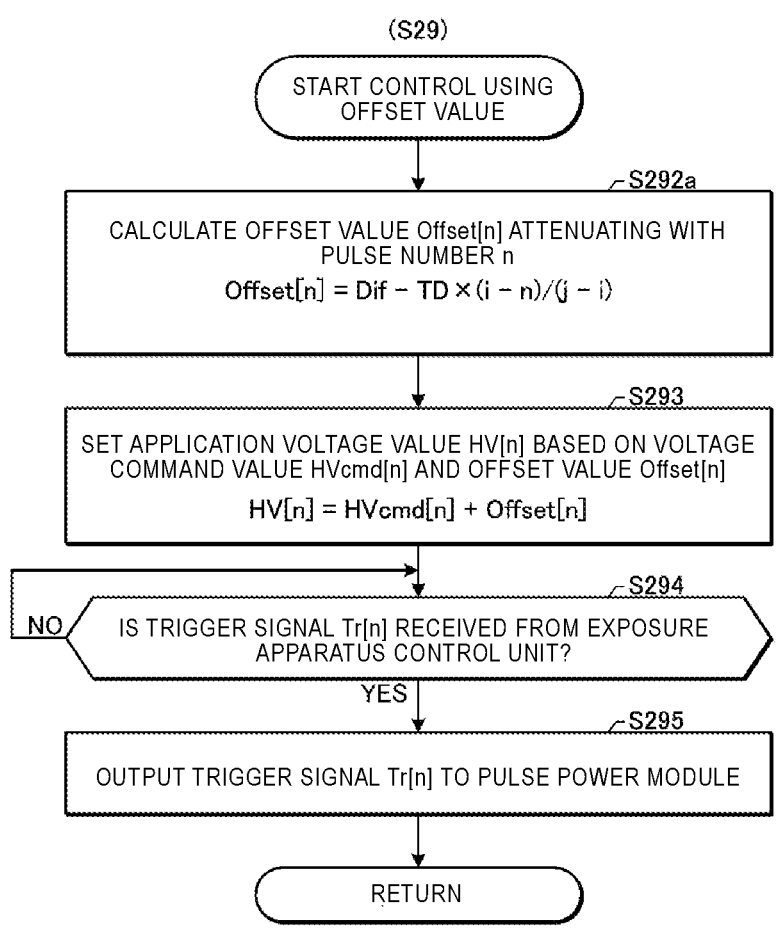
FIG. 19 is a flowchart showing control using the offset value Offset[n] in the second embodiment.

FIG. 19 is a flowchart showing the control using the offset value Offset[n] in the second embodiment. The processing of setting the application voltage value HV[n] in the second embodiment is similar to the processing of the first embodiment except for the control using the offset value Offset[n]. The processing shown in FIG. 19 is a subroutine of S29 in FIG. 11.

In S292a, the laser control unit 30 calculates, by the following equation, the offset value Offset[n] which attenuates as the pulse number n increases.

$$Offset[n] = Dif - TD \times (i-n)/(j-i)$$

Here, j−i obtained by subtracting i from j is a value corresponding to the length of the attenuation period. Immediately after the start of the attenuation period, since the pulse number n is close to i, TD×(i−n)/(j−i) is close to 0. Therefore, the offset value Offset[n] is a value close to the difference Dif. Immediately before the end of the attenuation period, since the pulse number n is a value close to j, TD×(i−n)/(j−i) is a value close to −TD. Therefore, the offset value Offset[n] is a value close to the sum of the difference Dif and the total attenuation amount TD. An attenuation amount per pulse is obtained by dividing the total attenuation amount TD by j−i. The processes of S11 and thereafter are similar to the corresponding processes in the first embodiment described with reference to FIG. 15. In other respects, the operation of the second embodiment is similar to that of the first embodiment.

3.3 Effect

Figure 20:
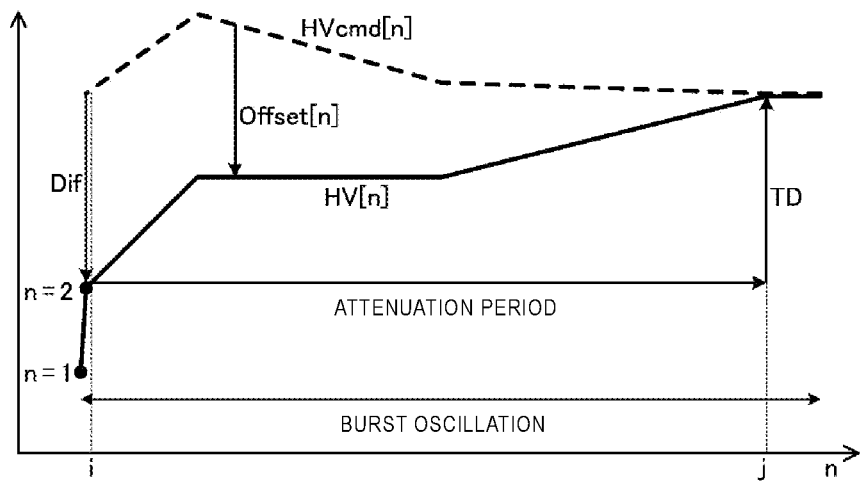
FIG. 20 is a graph showing a first example of transition of the application voltage value HV[n] in the second embodiment.

FIG. 20 is a graph showing a first example of the transition of the application voltage value HV[n] in the second embodiment. The offset value Offset[n] calculated in S292a in FIG. 19 attenuates by a constant attenuation amount, as the pulse number n increases, from a value close to Dif to a value close to Dif+TD. Accordingly, since the offset value Offset[n] is attenuated so as to compensate for the drift amount Drift(x) described with reference to FIG. 18, it is possible to make the change of the voltage command value HVcmd[n] more gradual than the change of the laser gain during the burst oscillation. Thus, it is possible to obtain stable pulse energy E[n].

Figure 21:
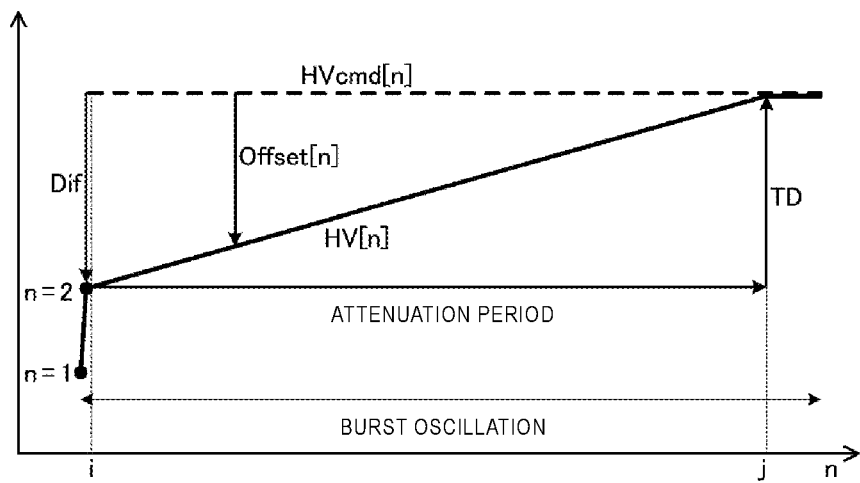
FIG. 21 is a graph showing a second example of transition of the application voltage value HV[n] in the second embodiment.

FIG. 21 is a graph showing a second example of the transition of the application voltage value HV[n] in the second embodiment. The offset value Offset[n] calculated in FIG. 21 is the same as the offset value Offset[n] calculated in FIG. 20. The difference between FIGS. 21 and 20 is the change in the laser gain of the laser device 1. In FIG. 21, the laser gain changes by a substantially constant amount in the period from the pulse number i to the pulse number j. The change in the voltage command value HVcmd[n] in the second embodiment is more gradual when the laser gain changes as shown in FIG. 21 than when the laser gain changes as shown in FIG. 20. Thus, it is possible to obtain stable pulse energy E[n].

Further, according to the second embodiment, the total attenuation amount TD of the offset value Offset[n] is calculated based on the drift amount Drift(x) of the application voltage value HV[n] (S14a in FIG. 17). Accordingly, since the offset value Offset[n] is attenuated so as to compensate for the drift amount Drift(x), it is possible to make the change of the voltage command value HVcmd[n] gradual.

According to the second embodiment, the total attenuation amount TD is calculated based on the drift amount Drift(x) at the time of the calibration oscillation (S14a in FIG. 17). Accordingly, the total attenuation amount TD is updated every time a semiconductor wafer is replaced, and it is possible to set the application voltage value HV[n] suitable for the latest laser characteristics.

4. Laser Device in which Attenuation Amount of Offset Value is Changed

A third embodiment will be described with reference to FIGS. 22 and 23. The third embodiment is different from the second embodiment in that the attenuation amount of the offset value Offset[n] is not constant but changes during burst oscillation. The configuration of the laser device 1 according to the third embodiment is similar to the configuration of the first embodiment described with reference to FIG. 5.

4.1 Control Using Offset Value (S29)

Figure 22:
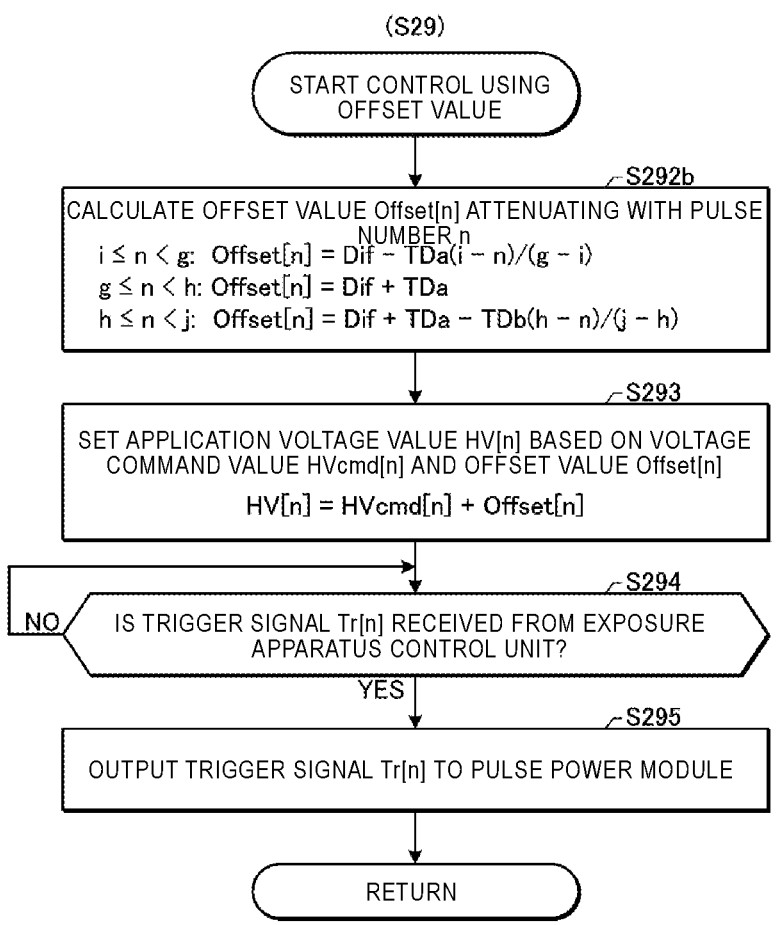
FIG. 22 is a flowchart showing control using the offset value Offset[n] in a third embodiment.

FIG. 22 is a flowchart showing the control using the offset value Offset[n] in the third embodiment. The processing of the laser control unit 30 in the third embodiment is similar to the processing in the second embodiment except for the control using the offset value Offset[n]. The processing shown in FIG. 22 is a subroutine of S29 in FIG. 11.

In the third embodiment, a plurality of attenuation periods each having a different attenuation amount are set. The plurality of attenuation periods include a first attenuation period and a second attenuation period.

(1) The pulse number n of the first attenuation period is within the following range.

$$i \leq n < g$$

Here, g is an integer larger than i and equal to or smaller than j.

(2) The pulse number n between the first attenuation period and the second attenuation period is within the following range.

$$g \leq n < h$$

Here, h is an integer equal to or larger than g and equal to or smaller than j.

(3) The pulse number n of the second attenuation period is within the following range.

$$h \leq n < j$$

The attenuation period is defined by g, h, and j described above. In the following description, g, h, and j are referred to as attenuation timings. The attenuation timings g, h, and j can be set by detecting the timings at which the application voltage value change in the calibration oscillation. When there is no period in which the attenuation amount is 0 between the first attenuation period and the second attenuation period, g is set to the value equal to h. When there is no second attenuation period, h is set to a value equal to j. When there is no period in which the attenuation amount is 0 after the first attenuation period and there is no second attenuation period, g and h are each set to the value equal to j.

In S292b, the laser control unit 30 calculates, by the following equation, the offset value Offset[n] which attenuates as the pulse number n increases.

(1) First Attenuation Period (i≤n<g)

$$\text{Offset }[n] = \text{Dif} - \text{TDa} \times (i-n)/(g-i)$$

Here, TDa is a total attenuation amount in the first attenuation period. The total attenuation amount TDa is calculated based on the drift amount Drift(x) within a certain period in the same manner as described with reference to FIG. 18. The attenuation amount Ra per pulse in the first attenuation period is obtained by dividing the total attenuation amount TDa by g−i.

$$Ra = TDa/(g-i)$$

(2) Between first attenuation period and second attenuation period (g≤n<h)

$$\text{Offset }[n] = \text{Dif} + \text{TDa}$$

The total attenuation amount in this period is 0, and the attenuation amount Rm per pulse is also 0.

(3) Second Attenuation Period (h≤i<j)

$$\text{Offset }[n] = \text{Dif} + \text{TDa} - \text{TDb} \times (h-n)/(jh)$$

Here, TDb is the total attenuation amount in the second attenuation period. The total attenuation amount TDb s calculated based on the drift amount Drift(x) within a certain period in the same manner as described with reference to FIG. 18. The attenuation amount Rb per pulse in the second attenuation period is obtained by dividing the total attenuation amount TDb by j−h.

$$Rb = TDb/(j-h)$$

The magnitude relationship among the attenuation amounts Ra, Rm, and Rb is as follows.

$$Rm < Rb < Ra$$

Ra corresponds to a first value in the present disclosure, Rm corresponds to a second value in the present disclosure, and Rb corresponds to a third value in the present disclosure.

The processes of S293 and thereafter are similar to the corresponding processes in the first embodiment described with reference to FIG. 15.

4.2 Effect

Figure 23:
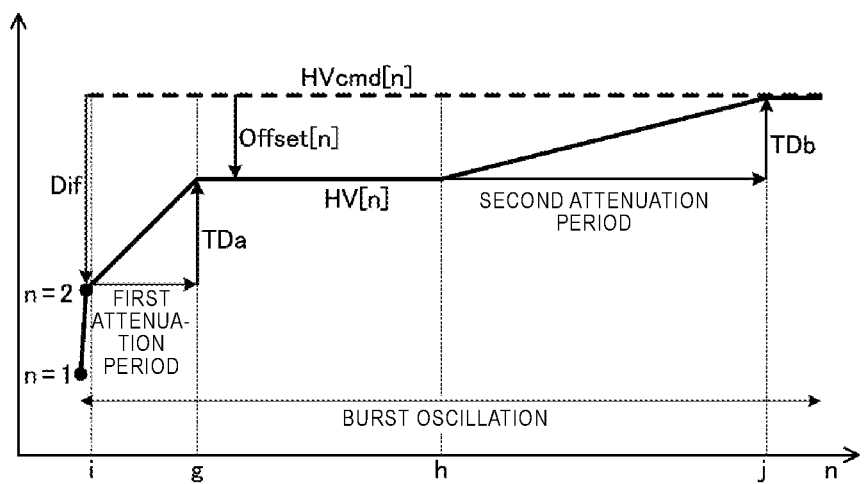
FIG. 23 is a graph showing an example of transition of the application voltage value HV[n] in the third embodiment.

FIG. 23 is a graph showing an example of the transition of the application voltage value HV[n] in the third embodiment. The offset value Offset[n] calculated in S292b in FIG. 22 is attenuated by each attenuation amount in the first attenuation period (i≤n<g) and the second attenuation period (h≤n<j). By changing the attenuation amount as the pulse number n increases in this manner, the offset value Offset[n] can be attenuated in accordance with the change characteristics of the laser gain. Therefore, the change in the voltage command value HVcmd[n] can be made more gradual than the change in the laser gain during the burst oscillation. Thus, it is possible to obtain stable pulse energy E[n].

5. Laser Device in which Application Voltage Value is Corrected Based on Repetition Frequency A fourth embodiment will be described with reference to FIGS. 24 to 27. The fourth embodiment is different from the first to third embodiments in that the application voltage value HV[n] is corrected based on the repetition frequency F of the pulse laser light in the control using the data table. The configuration of the laser device 1 according to the fourth embodiment is similar to the configuration of the first embodiment described with reference to FIG. 5.

5.1 Setting Application Voltage Value HV[n] (S2)

Figure 24:
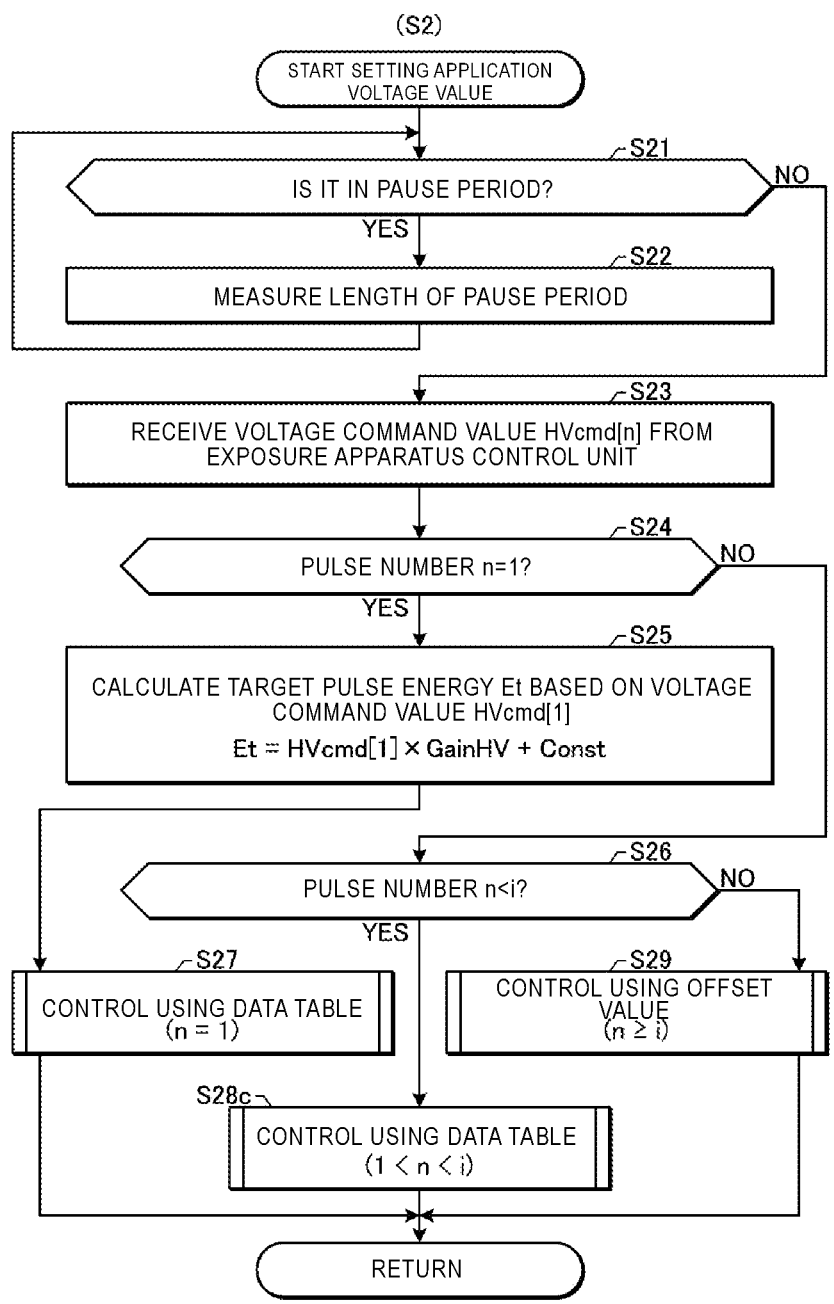
FIG. 24 is a flowchart showing processing of setting the application voltage value HV[n] in a fourth embodiment.

FIG. 24 is a flowchart showing processing of setting the application voltage value HV[n] in the fourth embodiment. The main routine in the fourth embodiment is similar to the main routine in the first embodiment described with reference to FIG. 8. The processing shown in FIG. 24 is a subroutine of S2 in FIG. 8. The processing shown in FIG. 24 is different from those of the first to third embodiments in that the control using the data table includes two types of processes of S27 and S28c. In other respects, the processing is similar to that described with reference to FIG. 11.

When the pulse number n is 1 in S24, the application voltage value HV[n] is set in S27 through S25. The process of S27 is similar to the corresponding process in FIG. 11. When the pulse number n is larger than 1 and smaller than i, it is determined that the pulse number n is smaller than i in S26 (S26: YES), and the process proceeds to S28c. In S28c, the application voltage value HV[n] is calculated and corrected based on the repetition frequency F. After S28c, the laser control unit 30 terminates the processing of the flowchart shown in FIG. 24 and returns to the processing shown in FIG. 8.

Figure 25:
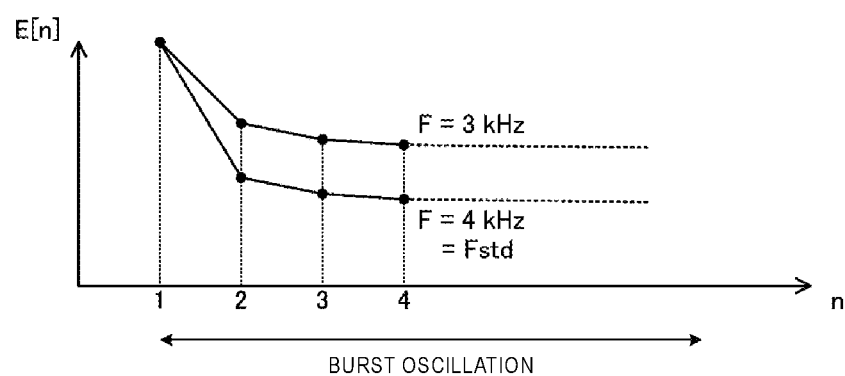
FIG. 25 is a graph showing transition of the pulse energy E[n] when the burst oscillation is performed at different repetition frequencies F with the application voltage value HV[n] being a constant value.

FIG. 25 is a graph showing the transition of the pulse energy E[n] when the burst oscillation is performed at different repetition frequencies F with the application voltage value HV[n] being a constant value. FIG. 25 shows only the pulse energy E[n] immediately after the start of the burst oscillation. There may be case in which the laser gain of the laser device 1 tends to decrease as the repetition frequency F increases. The pulse energy E[1] of the pulse whose pulse number n is 1 does not depend on the repetition frequency F, but the pulse energy E[n] of the pulse whose pulse number n is 2 or larger may depend on the repetition frequency F. Therefore, when the pulse number n is larger than 1 and smaller than i, the application voltage value HV[n] is corrected in S28c.

5.2 Control Using Data Table (S28c)

Figure 26:
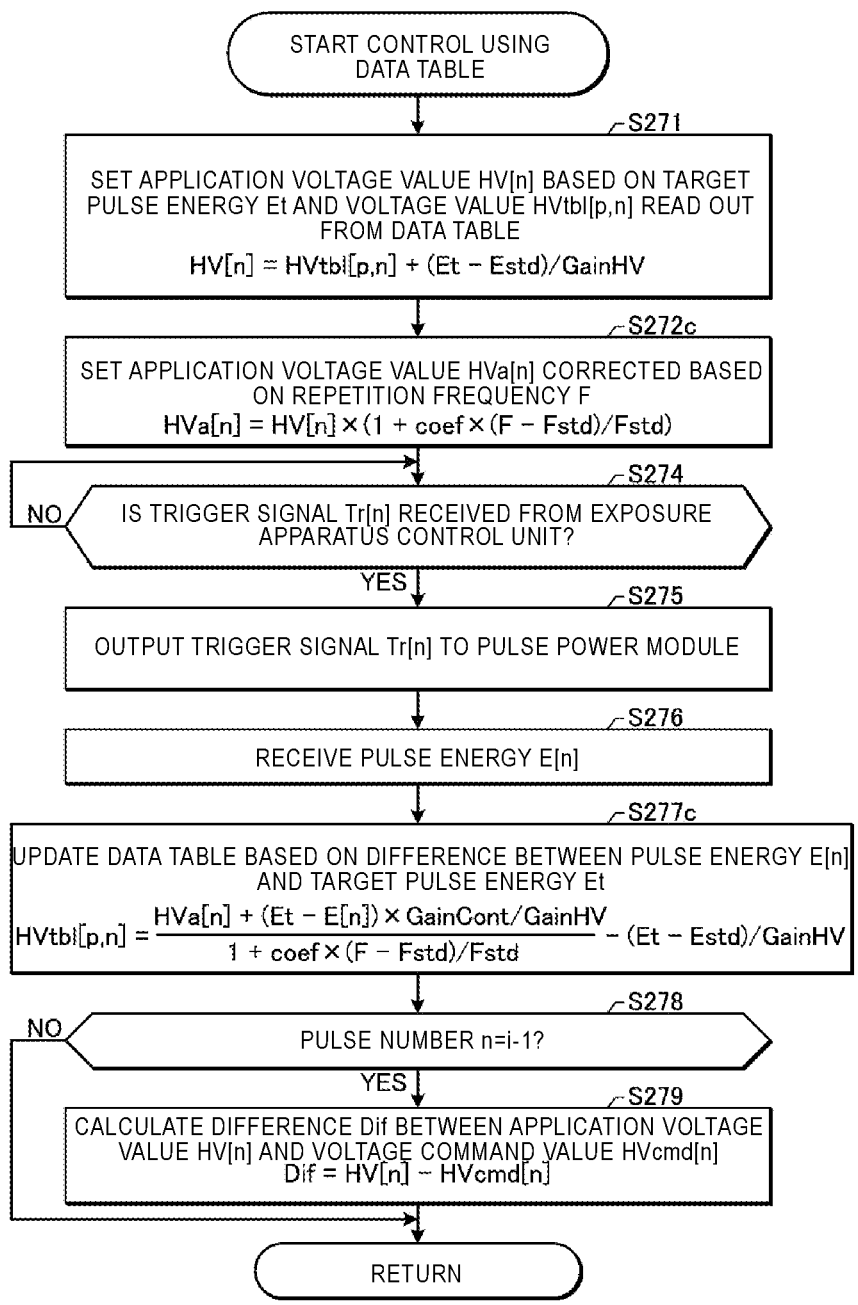
FIG. 26 is a flowchart showing control when a pulse number n is larger than 1 and smaller than i in control using the data table according to the fourth embodiment.

FIG. 26 is a flowchart showing control when the pulse number n is larger than 1 and smaller than i in the control using the data table according to the fourth embodiment. The processing shown in FIG. 26 is a subroutine of S28c in FIG. 24. The processing of setting the application voltage value HV[n] in S271 is similar to the corresponding processing described with reference to FIG. 13.

In S272c, the laser control unit 30 sets, by the following equation, the application voltage value HVa[n] corrected based on the repetition frequency F.

$$HVa\ [n] = HV\ [n] \times (1 + coef \times (F - Fstd)/Fstd)$$

Here, Fstd is a reference frequency, for example, 4 kHz. The voltage value HVtbl[p,n] of the data table stored in the storage unit 31 is set to such a value that the pulse energy E[n] becomes a predetermined value Estd in the burst oscillation at the reference frequency Fstd. Further, coef is a weighting coefficient by which a value (F−Fstd)/Fstd obtained by dividing the difference between the repetition frequency F and the reference frequency Fstd by the reference frequency Fstd is multiplied.

When the laser control unit 30 is notified of the repetition frequency F from the exposure apparatus control unit 110, the above-described correction is performed using the repetition frequency F. When the laser control unit 30 is not notified of the repetition frequency F from the exposure apparatus control unit 110, the repetition frequency F is calculated based on the time difference between the trigger signal Tr[1] and the trigger signal Tr[2], and the above-described correction is performed.

Figure 27:
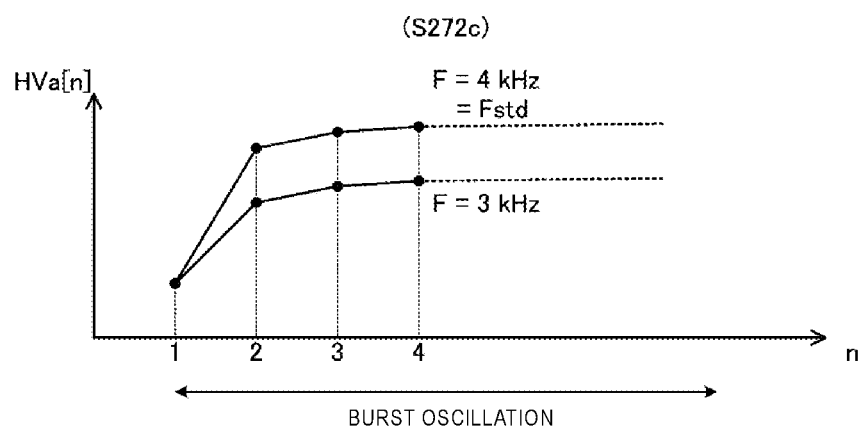
FIG. 27 is a graph showing transition of the application voltage value HVa[n] when the application voltage value HV[n] is corrected so as to maintain the pulse energy E[n] at a constant value.

FIG. 27 is a graph showing the transition of the application voltage value HVa[n] when the application voltage value HV[n] is corrected so as to maintain the pulse energy E[n] at a constant value. FIG. 27 shows only the application voltage value HVa[n] immediately after the start of the burst oscillation. The laser gain of the laser device 1 when the repetition frequency F is 3 kHz is less likely to decrease than when the repetition frequency F is 4 kHz. Therefore, when the repetition frequency F is 3 kHz, the application voltage value HVa[n] when the pulse number n is 2 or larger is corrected to be lower than that when the repetition frequency F is 4 kHz. Thus, the pulse energy E[n] can be brought close to the desired value.

Referring again to FIG. 26, the processes of S274 to S276 are similar to the corresponding processes described with reference to FIG. 13.

In S277c, the laser control unit 30 updates the voltage value HVtbl[p,n] of the data table based on the difference between the pulse energy E[n] and the target pulse energy Et. The voltage value HVtbl[p,n] of the data table is calculated by the following equation in consideration of the correction based on the repetition frequency F.

$$HVtbl\ [p, n] = (HVa\ [n] + (Et - E[n]) \times GainCont/GainHV)$$
$$/(1 + coef \times (F - Fstd)/Fstd) - (Et - Estd)/GainHV$$

The processes of S278 and S279 are similar to the processes described with reference to FIG. 13. In other respects, the operation of the fourth embodiment is similar to that of the first to third embodiments.

5.3 Effect

According to the fourth embodiment, even when the voltage value HVtbl[p,n] is not stored separately in accordance with the repetition frequency F, the application voltage value HVa[n] can be set appropriately in accordance with the repetition frequency F.

6. Laser Device in which Total Attenuation Amount and Attenuation Timing are Corrected Based on Repetition Frequency A fifth embodiment will be described with reference to FIGS. 28 to 31. The fifth embodiment is different from the first to fourth embodiments in that the total attenuation amount TD of the offset value Offset[n] and the attenuation timing j are corrected based on the repetition frequency F of the pulse laser light in the control using the offset value Offset[n]. The configuration of the laser device 1 according to the fifth embodiment is similar to the configuration of the first embodiment described with reference to FIG. 5. Further, the main routine in the fifth embodiment is similar to the main routine in the first embodiment described with reference to FIG. 8. However, in the fifth embodiment, the process of calculating the total attenuation amount TD is performed. Since the processing for calculating the total attenuation amount TD is similar to the processing of FIG. 17, the description thereof is omitted.

6.1 First Example

Figure 28:
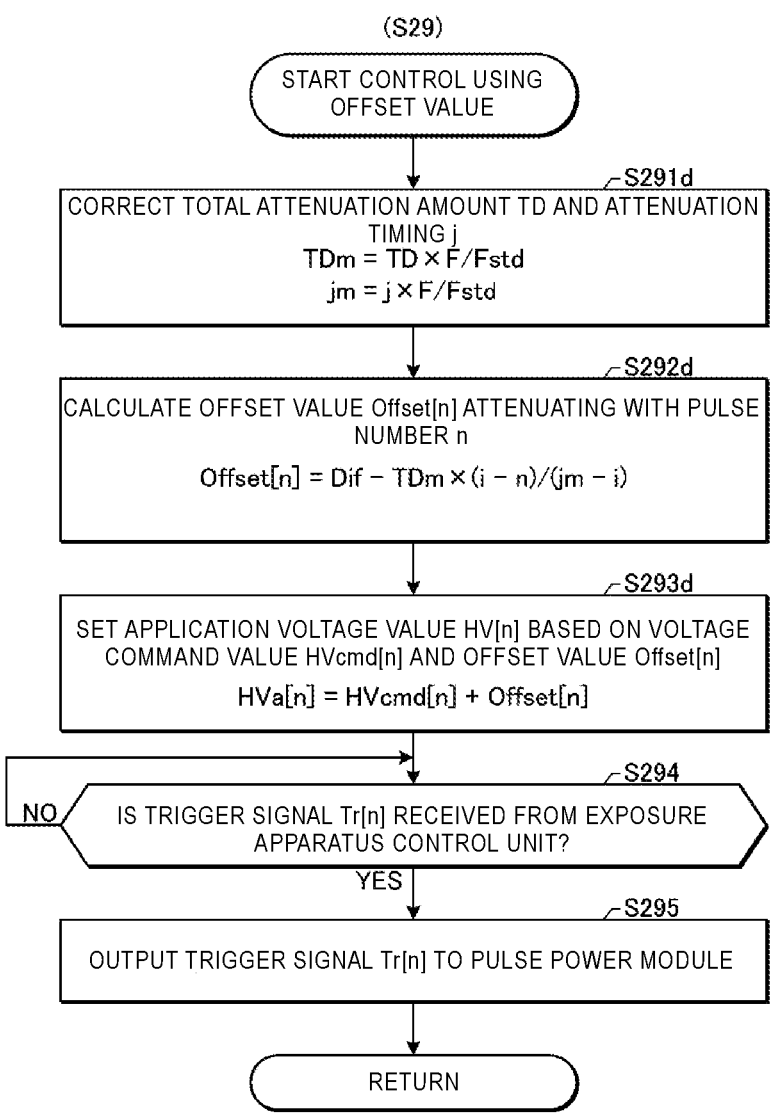
FIG. 28 is a flowchart showing control using the offset value Offset[n] in a first example of a fifth embodiment.

FIG. 28 is a flowchart showing the control using the offset value Offset[n] in a first example of the fifth embodiment. The processing of setting the application voltage value HV[n] in the first example is similar to the processing of the first to fourth embodiments except for the control using the offset value Offset[n]. The processing shown in FIG. 28 is a subroutine of S29 in FIG. 11. Alternatively, the processing shown in FIG. 28 is a subroutine of S29 in FIG. 24.

In S291d, the laser control unit 30 corrects the total attenuation amount TD of the offset value Offset[n] and the attenuation timing j by the following equations, and calculates the corrected total attenuation amount TDm and the corrected attenuation timing jm.

$$TDm = TD \times F/Fstd$$
$$jm = j \times F/Fstd$$

The correction based on the repetition frequency F may involve weighting using a coefficient.

Figure 29:
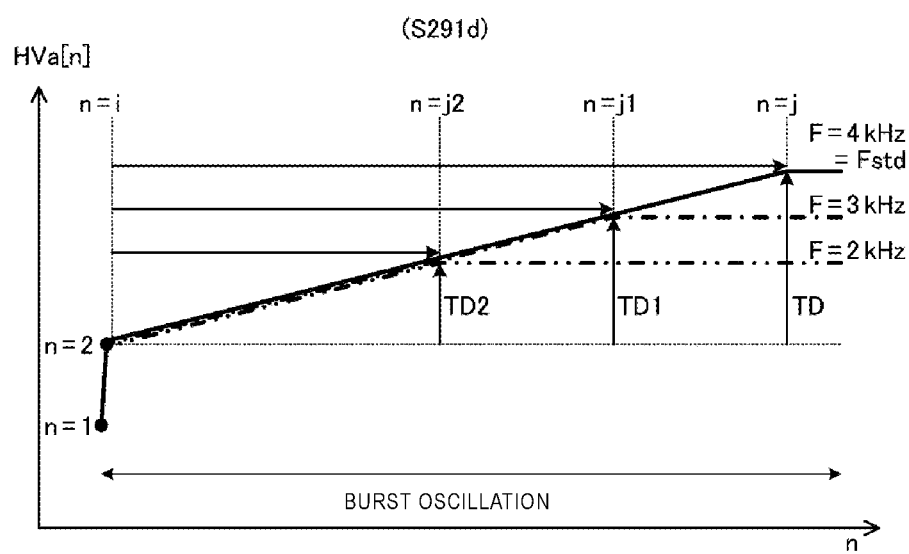
FIG. 29 is a graph showing processing of correcting the total attenuation amount TD and an attenuation timing j in the first example.

FIG. 29 is a graph showing the process of correcting the total attenuation amount TD and the attenuation timing j in the first example. In FIG. 29, the change of the laser gain during the burst oscillation may be similar to the change of the laser gain in FIG. 21. The total attenuation amount TD and the attenuation timing j are set so as to adapt to the change in the laser gain when the repetition frequency F is 4 kHz. The attenuation timing j can be set by detecting the timing at which the application voltage value HV[n] changes in the calibration oscillation. The total attenuation amount TD can be calculated based on the drift amount Drift(x) of the application voltage value HV[n] in the calibration oscillation.

When the repetition frequency F is 3 kHz or 2 kHz, the corrected total attenuation amount TDm and the corrected attenuation timing jm are calculated according to the above-described equations. Specific calculation is shown as follows.

$$TD1 = TD \times 3/4$$
$$j1 = j \times 3/4$$
$$TD2 = TD \times 2/4$$
$$j2 = j \times 2/4$$

TD1 and j1 are the corrected total attenuation amount and the corrected attenuation timing, respectively, when the repetition frequency F is 3 kHz. TD2 and j2 are the corrected total attenuation amount and the corrected attenuation timing, respectively, when the repetition frequency F is 2 kHz. By performing the calculation as described above, it is possible to calculate the offset value Offset[n] appropriately in accordance with the characteristics of the laser device 1.

Referring again to FIG. 28, the processes of S292*d* and S293*d* are similar to the processes of S292*a* and S293, respectively. However, some variables are replaced as accompanying correction. The processes of S294 and S295 are similar to the processes of S294 and S295 in FIG. 19, respectively.

6.2 Second Example

Figure 30:
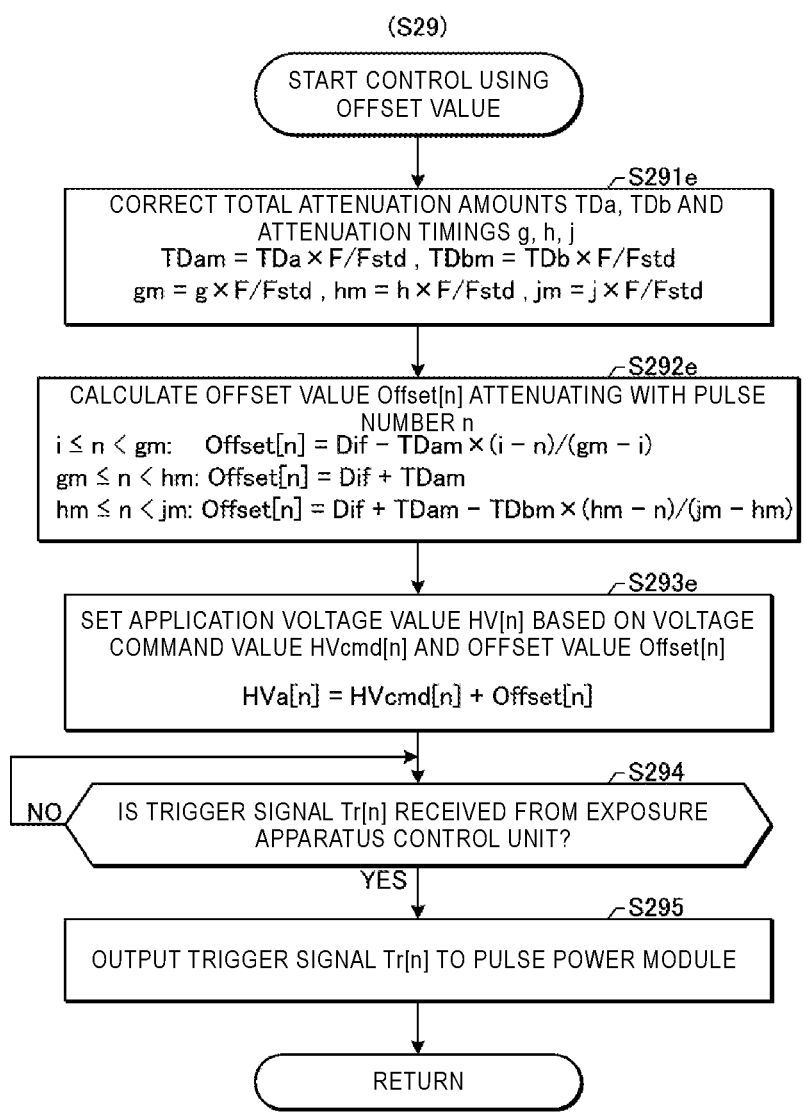
FIG. 30 is a flowchart showing control using the offset value Offset[n] in a second example of the fifth embodiment.

FIG. 30 is a flowchart showing the control using the offset value Offset[n] in a second example of the fifth embodiment. The processing of setting the application voltage value HV[n] in the second example is similar to the processing of the first to fourth embodiments except for the control using the offset value Offset[n]. The processing shown in FIG. 30 is a subroutine of S29 in FIG. 11. Alternatively, the processing shown in FIG. 30 is a subroutine of S29 in FIG. 24.

In S291*e*, the laser control unit 30 corrects the total attenuation amounts TDa, TDb of the offset value Offset[n] and the attenuation timings g, h, j by the following equations, and calculates the corrected total attenuation amounts TDam, TDbm and the corrected attenuation timings gm, hm, jm.

$$TDam = TDa \times F/Fstd \quad TDbm = TDb \times F/Fstd$$
$$gm = g \times F/Fstd$$
$$hm = h \times F/Fstd$$
$$jm = j \times F/Fstd$$

The correction based on the repetition frequency F may involve weighting using a coefficient.

Figure 31:
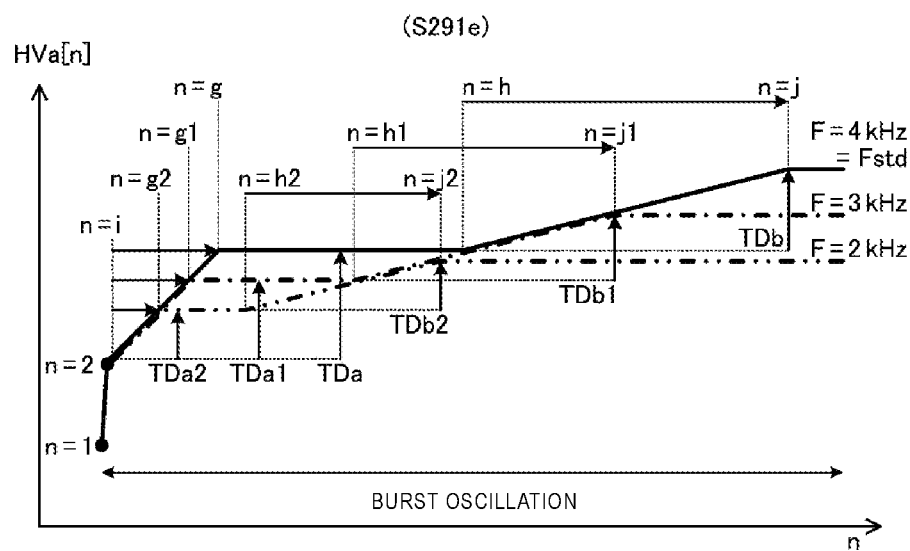
FIG. 31 is a graph showing processing of correcting total attenuation amounts TDa, TDb and attenuation timings g, h, j in the second example.

FIG. 31 is a graph showing the process of correcting the total attenuation amounts TDa, TDb and the attenuation timings g, h, j in the second example. In FIG. 31, the change of the laser gain during the burst oscillation may be similar to the change of the laser gain in FIG. 23. The total attenuation amounts TDa, TdB and the attenuation timings g, h, j are set so as to adapt to a change in the laser gain when the repetition frequency F is 4 kHz. The attenuation timings g, h, j can be set by detecting the timings at which the application voltage value HV[n] changes in the calibration oscillation. The total attenuation amounts TDa, TdB can be calculated based on the drift amount Drift(x) of the application voltage value HV[n] in the calibration oscillation.

When the repetition frequency F is 3 kHz or 2 kHz, the corrected total attenuation amounts TDam, TDbm and the corrected attenuation timings gm, hm, jm are calculated according to the above-described equations. Specific calculation is shown as follows.

$$TDa1 = TDa \times 3/4$$
$$TDb1 = TDb \times 3/4$$
$$g1 = g \times 3/4$$
$$h1 = h \times 3/4$$
$$j1 = j \times 3/4$$
$$TDa2 = TDa \times 2/4$$
$$TDb2 = TDb \times 2/4$$
$$g2 = g \times 2/4$$
$$h2 = h \times 2/4$$
$$j2 = j \times 2/4$$

TDa1 and TDb1 are the corrected total attenuation amounts when the repetition frequency F is 3 kHz. Further, g1, h1, and j1 are the corrected attenuation timings when the repetition frequency F is 3 kHz. TDa2 and TDb2 are the corrected total attenuation amounts when the repetition frequency F is 2 kHz. Further, g2, h2, and j2 are the corrected attenuation timings when the repetition frequency F is 2 kHz. By performing the calculation as described above, it is possible to calculate the offset value Offset[n] appropriately in accordance with the characteristics of the laser device 1.

Referring again to FIG. 30, the processes of S292*e* and S293*e* are similar to the processes of S292*b* and S293 in FIG. 22, respectively. However, some variables are replaced as accompanying correction. The processes of S294 and S295 are similar to the processes of S294 and S295 in FIG. 22, respectively. In other respects, the operation of the fifth embodiment is similar to that of the first to fourth embodiments.

6.3 Effect

According to the fifth embodiment, even when the total attenuation amount TD and the attenuation timing j are not stored separately in accordance with the repetition frequency F, the application voltage value HVa[n] can be set appropriately in accordance with the repetition frequency F.

7. Others

Figure 32:
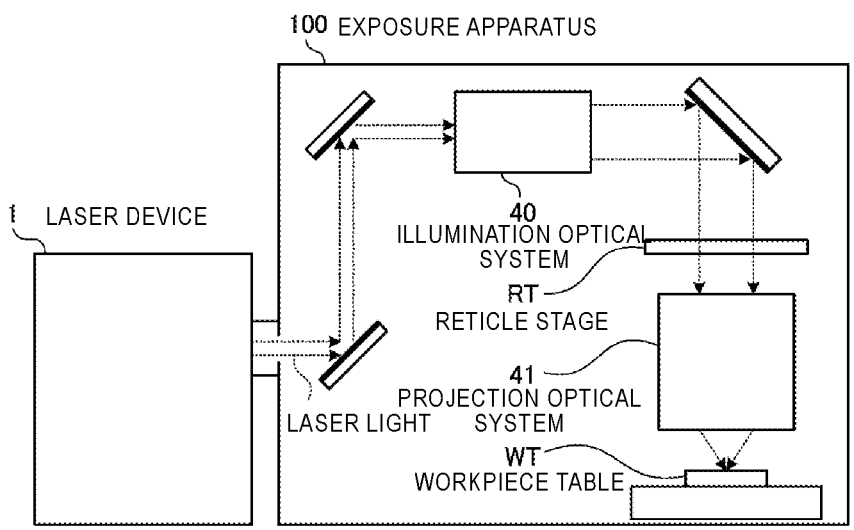
FIG. 32 schematically shows the configuration of an exposure apparatus connected to the laser device.

FIG. 32 schematically shows the configuration of the exposure apparatus 100 connected to the laser device 1. The laser device 1 generates pulse laser light and outputs the pulse laser light to the exposure apparatus 100. In FIG. 32, the exposure apparatus 100 includes an illumination optical system 40 and a projection optical system 41. The illumination optical system 40 illuminates a reticle pattern of a reticle (not shown) arranged on a reticle stage RT with the pulse laser light incident from the laser device 1. The projection optical system 41 causes the pulse laser light transmitted through the reticle to be imaged as being reduced and projected on a workpiece (not shown) arranged on a workpiece table WT. The workpiece is a photosensitive substrate such as a semiconductor wafer on which photoresist is applied. The exposure apparatus 100 synchronously translates the reticle stage RT and the workpiece table WT to expose the workpiece to the pulse laser light reflecting the reticle pattern. After the reticle pattern is transferred onto the semiconductor wafer by the exposure process described above, a semiconductor device can be manufactured through a plurality of processes.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious to those skilled in the art that embodiments of the present disclosure would be appropriately combined.

The terms used throughout the present specification and the appended claims should be interpreted as non-limiting terms unless clearly described. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. A laser device which outputs pulse laser light by performing plural times of burst oscillation including first burst oscillation and second burst oscillation performed next to the first burst oscillation in accordance with a voltage command value and a trigger signal input from an external device, the laser device comprising:
    a laser resonator;
    a chamber arranged on an optical path of the laser resonator;
    a pair of electrodes arranged in the chamber;
    a power source configured to apply a voltage to the electrodes;
    a storage unit configured to store a voltage value at which pulse energy of the pulse laser light becomes a predetermined value; and
    a control unit configured to set an application voltage value of the voltage applied to the electrodes as setting the application voltage value for outputting a pulse whose pulse number is equal to or larger than 1 and smaller than i based on the voltage command value and the voltage value stored in the storage unit, and setting the application voltage for outputting a pulse whose pulse number is equal to or larger than i and smaller than j based on the voltage command value and an offset value corresponding to the voltage command value, the pulse number indicating an order of the pulse among a plurality of pulses included in the pulse laser light output in one burst oscillation among the plural times of burst oscillation, where i is an integer larger than 1 and j is an integer larger than i.

2. The laser device according to claim 1,
wherein the storage unit stores a data table in which the voltage value at which the pulse energy of the pulse laser light becomes the predetermined value is associated with a combination of the pulse number and a length of a pause period from when the first burst oscillation ends to when the second burst oscillation starts, and
the control unit sets the application voltage value for outputting a pulse whose pulse number is equal to or larger than 1 and smaller than i based on the voltage value read out from the data table based on the length of the pause period and the pulse number.

3. The laser device according to claim 1,
wherein the control unit calculates target pulse energy based on the voltage command value, and sets the application voltage value for outputting a pulse whose pulse number is equal to or larger than 1 and smaller than i based on the target pulse energy and the voltage value stored in the storage unit.

4. The laser device according to claim 3,
wherein the control unit calculates, based on measurement data obtained during calibration oscillation, a parameter for calculating the target pulse energy based on the voltage command value.

5. The laser device according to claim 3,
further comprising an energy monitor configured to measure pulse energy of the pulse laser light,
wherein the control unit performs a process of updating the voltage value stored in the storage unit based on a difference between the pulse energy of the pulse laser light and the target pulse energy.

6. The laser device according to claim 5,
wherein the control unit performs the process after a pulse whose pulse number is 1 is output and before a pulse whose pulse number is 2 is output.

7. The laser device according to claim 1,
wherein the control unit calculates the offset value based on a difference between the voltage command value for outputting a pulse whose pulse number is i−1 and the application voltage value for outputting a pulse whose pulse number is i−1.

8. The laser device according to claim 1,
wherein the control unit sets the offset value for outputting a pulse whose pulse number is equal to or larger than i and smaller than j to a constant value.

9. The laser device according to claim 1,
wherein the control unit sets the offset value for outputting a pulse whose pulse number is equal to or larger than i and smaller than j to a value which attenuates in accordance with increase of the pulse number.

10. The laser device according to claim 1,
wherein the control unit sets the offset value for outputting a pulse whose pulse number is equal to or larger than i and smaller than j to a value which attenuates by a constant attenuation amount in accordance with increase of the pulse number.

11. The laser device according to claim 1,
wherein the control unit calculates a total attenuation amount of the offset value based on a drift amount of the application voltage value and calculates the offset value based on the total attenuation amount such that the offset value attenuates in accordance with increase of the pulse number.

12. The laser device according to claim 11,
wherein the control unit calculates the total attenuation amount based on the drift amount during calibration oscillation.

13. The laser device according to claim 1,
wherein the control unit sets the offset value for outputting a pulse whose pulse number is equal to or larger than i and smaller than j to a value which is obtained by changing an attenuation amount in accordance with increase of the pulse number.

14. The laser device according to claim 1,
wherein the control unit calculates the offset value as setting an attenuation amount of the offset value for outputting a pulse whose pulse number is equal to or larger than i and smaller than g as a first value and setting the attenuation amount of the offset value for outputting a pulse whose pulse number is equal to or larger than g and smaller than h as a second value which is smaller than the first value, where g is an integer larger than i and equal to or smaller than j and h is an integer equal to or larger than g and equal to or smaller than j.

15. The laser device according to claim 14,
wherein the control unit calculates the offset value as setting the attenuation amount of the offset value for outputting a pulse whose pulse number is equal to or larger than h and smaller than j as a third value which is smaller than the first value and larger than the second value.

16. The laser device according to claim 1,
wherein the control unit sets the application voltage value corrected based on a repetition frequency of the pulse laser light for outputting a pulse whose pulse number is larger than 1 and smaller than i.

17. The laser device according to claim 16,
wherein the control unit sets the application voltage value corrected so that the application voltage value becomes lower as the repetition frequency of the pulse laser light becomes smaller.

18. The laser device according to claim 1,
wherein the control unit calculates a total attenuation amount of the offset value based on a drift amount of the application voltage value, corrects the total attenuation amount based on a repetition frequency of the pulse laser light, and calculates the offset value based on the corrected total attenuation amount such that the offset value attenuates in accordance with increase of the pulse number.

19. The laser device according to claim 1,
wherein the control unit sets an attenuation timing based on change of the application voltage value, corrects the attenuation timing based on a repetition frequency of the pulse laser light, and calculates the offset value based on the corrected attenuation timing such that the offset value attenuates in accordance with increase of the pulse number.

20. An electronic device manufacturing method, comprising:
generating pulse laser light using a laser device;
emitting the pulse laser light to an exposure apparatus; and
exposing a photosensitive substrate to the pulse laser light in the exposure apparatus to manufacture an electronic device,
the laser device outputting pulse laser light by performing plural times of burst oscillation including first burst oscillation and second burst oscillation performed next to the first burst oscillation in accordance with a voltage command value and a trigger signal input from an external device, and including:
a laser resonator;
a chamber arranged on an optical path of the laser resonator;
a pair of electrodes arranged in the chamber;
a power source configured to apply a voltage to the electrodes;
a storage unit configured to store a voltage value at which a pulse energy of the pulse laser light becomes a predetermined value;
a control unit configured to set an application voltage value of the voltage applied to the electrodes as setting the application voltage value for outputting a pulse whose pulse number is equal to and larger than 1 and smaller than i based on the voltage command value and the voltage value stored in the storage unit, and setting the application voltage for outputting a pulse whose pulse number is equal to or larger than i and smaller than j based on the voltage command value and an offset value corresponding to the voltage command value, the pulse number indicating an order of the pulse among a plurality of pulses included in the pulse laser light output in one burst oscillation among the plural times of burst oscillation, where i is an integer larger than 1 and j is an integer larger than i.

* * * * *